US006724932B1

United States Patent
Ito

(10) Patent No.: US 6,724,932 B1
(45) Date of Patent: Apr. 20, 2004

(54) IMAGE PROCESSING METHOD, IMAGE PROCESSOR, AND STORAGE MEDIUM

(75) Inventor: Wataru Ito, Kaisei-machi (JP)

(73) Assignee: Fuji Photo Film Co., Ltd., Kanagawa-ken (JP)

( * ) Notice: Subject to any disclaimer, the term of this patent is extended or adjusted under 35 U.S.C. 154(b) by 634 days.

(21) Appl. No.: 09/627,244

(22) Filed: Jul. 27, 2000

(30) Foreign Application Priority Data

Jul. 27, 1999 (JP) ............................................. 11-212202
May 26, 2000 (JP) ........................................ 2000-155621

(51) Int. Cl.⁷ .............................. G06K 9/36; H04N 1/56
(52) U.S. Cl. ....................... 382/162; 358/514; 358/525; 348/275
(58) Field of Search ................................. 382/162, 167; 358/1.9, 512, 514, 518, 525; 250/208.1; 348/262, 264, 272, 275, 280, 273; 257/291

(56) References Cited

U.S. PATENT DOCUMENTS

| | | | |
|---|---|---|---|
| 5,253,046 A | * 10/1993 | Shiraishi | 348/237 |
| 5,373,322 A | * 12/1994 | Laroche et al. | 348/273 |
| 5,990,950 A | * 11/1999 | Addison | 348/273 |
| 6,130,960 A | * 10/2000 | Acharya | 382/167 |
| 6,181,376 B1 | * 1/2001 | Rashkovskiy et al. | 348/273 |
| 6,388,706 B1 | * 5/2002 | Takizawa et al. | 348/273 |
| 6,404,918 B1 | * 6/2002 | Hel-or et al. | 382/167 |
| 6,424,753 B1 | * 7/2002 | Yamaguchi | 382/300 |
| 6,426,773 B1 | * 7/2002 | Suzuki | 348/272 |
| 6,476,865 B1 | * 11/2002 | Gindele et al. | 348/277 |
| 6,487,309 B1 | * 11/2002 | Chen | 382/162 |
| 6,496,608 B1 | * 12/2002 | Chui | 382/300 |
| 6,549,233 B1 | * 4/2003 | Martin | 348/273 |
| 6,567,192 B1 | * 5/2003 | Toyomura et al. | 358/497 |
| 2002/0012055 A1 | * 1/2002 | Koshiba et al. | 348/273 |

FOREIGN PATENT DOCUMENTS

| | | |
|---|---|---|
| JP | A5228108 | 9/1993 |
| JP | A630444 | 2/1994 |
| JP | A6225343 | 8/1994 |
| JP | A089199 | 1/1996 |
| JP | A9214989 | 8/1997 |
| JP | A10136931 | 5/1998 |
| JP | A10200906 | 7/1998 |

OTHER PUBLICATIONS

Sakamoto et al, Software pixel interpolation for digital still cameras suitable for a 32–bit MCU, IEEE Transactions on Consumer Electronics, Nov. 1998, vol. 44, iss 4, pp. 1342–1352.*

* cited by examiner

Primary Examiner—Bhavesh M. Mehta
Assistant Examiner—Christopher Sukhaphadhana
(74) Attorney, Agent, or Firm—Birch, Stewart, Kolasch & Birch, LLP

(57) ABSTRACT

The computation of an R06-signal at a G06-pixel position that has only a G-signal on a line of B-pixels and G-pixels is performed by an equation of R06=G06+(R09+G09), based on the assumption that the difference between an R-signal and a G-signal is constant at local regions of an image, i.e., the assumption that a relation of R06−G06= R09−G09 is established. In this case, the G09-signal at the R09-pixel position is computed by performing a one-dimensional interpolation on a G-signal on an RG line including the R09-pixel position, like G09=(G05+G13)/2, etc.

169 Claims, 13 Drawing Sheets

FIG.2A

| R | G | R | G | R |
|---|---|---|---|---|
| G | B | G | B | G |
| R | G | R | G | R |
| G | B | G | B | G |
| R | G | R | G | R |

| R | * | B | * | R | * | B |
|---|---|---|---|---|---|---|
| * | G | * | G | * | G | * |
| B | * | R | * | B | * | R |
| * | G | * | G | * | G | * |
| R | * | B | * | R | * | B |

IMAGE PROCESSING METHOD, IMAGE PROCESSOR, AND STORAGE MEDIUM

BACKGROUND OF THE INVENTION

1. Field of the Invention

The present invention relates to an image processing method and an image processor for estimating a signal value at all pixel positions by employing image data which does not have a signal value representing all colors at all pixel positions, like image data representing a color image obtained by an imaging device such as a single plate charge-coupled device (CCD), and to a computer readable storage medium storing a program for causing a computer to execute the image processing method.

2. Description of the Related Art

As an imaging device such as a CCD employed in a digital camera, an imaging device in which a plurality of kinds of photoelectric conversion elements differing in spectral sensitivity are alternately arrayed on the same surface (hereinafter referred to a single plate CCD) is known. In the case of the single plate CCD, in which photoelectric conversion elements having spectral sensitivities for red (R), green (G), and blue (B), i.e., photoelectric conversion elements for an R-channel, a G-channel, and a B-channel are alternately arrayed, a set of three continuous photoelectric conversion elements for an R-channel, a G-channel, and a B-channel constitutes a single pixel. In such a single plate CCD, however, shift of color alignment or a false color sometimes occurs because the R-signal, G-signal, and B-signal values at each pixel cannot be obtained at the same pixel position. Also, since the number of photoelectric conversion elements for channels is less than the total number of pixels constituting a single plate CCD, an image with high resolution cannot be obtained. For instance, in a single plate CCD where photoelectric conversion elements for an R-channel, a G-channel, and a B-channel are alternately arrayed, the number of photoelectric conversion elements for channels is only one-third the total number of elements and therefore the resolution becomes ⅓ compared with a monochrome imaging device having the same number of elements. Because of this, a method has been proposed in which a signal value is computed by an interpolating process at a position where photoelectric conversion elements for an R-channel, a G-channel, and a B-channel are not present. However, there are cases where only an interpolating process causes a false color to occur at a position where a signal value changes considerably. In this case, although the occurrence of a false color can be prevented by using an optical low-pass filter in an imaging system, or by performing a smoothing process on an image signal through a low-pass filter, there is a problem that the resolution will degrade.

Here, human visual sense characteristics are higher in sensitivity with respect to brightness than with respect to color. For this reason, a method has been proposed in which a high-frequency brightness signal (which represents the brightness of each pixel) and a low-frequency color signal (obtained by the above-mentioned interpolating process and the smoothing process which employs a low-pass filter) are generated from a color image signal obtained by a single plate CCD and color image signals are reconstituted by the generated brightness signal and color signal (Japanese Unexamined Patent Publication No. 10(1998)-200906). This method can obtain color image signals capable of reproducing an image whose resolution is apparently high, because much information about a brightness component whose sensitivity is high in the human visual sense characteristic can be given.

Incidentally, a CCD with a honeycomb array of pixels arrayed checkerwise as shown in FIG. 16, for example, is known as a single plate CCD (e.g., Japanese Unexamined Patent Publication No. 10(1998)-136391). This is also called a checkered pixel array. There is known another CCD that has a Bayer array of pixels arrayed in square form, as shown in FIG. 17. This is also called a square pixel array. The single plate CCD having such an array of pixels also has the problem of false color. Furthermore, a method is known which is based on the assumption that the ratio of an r-signal, a g-signal, and a b-signal is approximately constant at local regions of an image (Japanese Unexamined Patent Publication No. 9(1997)-214989). In order to remove a false color from a light-quantity based signal obtained by the aforementioned CCD having a Bayer array of pixels, in the vertical or horizontal direction of the CCD a g-signal is multiplied by the ratio of a r-signal and a g-signal obtained at the adjacent line, whereby an r-signal at that line is computed. More specifically, in an array of pixels shown in FIG. 18, in order to compute an r-signal r12 at a g12-pixel position, a g11-signal at an r11-pixel position is first computed by an equation of (g6+g16)/2. Based on an assumption of r11:g11=r12:g12, the r12-signal at the g12-pixel position is computed by an equation of r12=g12×r11/g11.

However, in the method disclosed in the above-mentioned Japanese Unexamined Patent Publication No. 10(1998)-200906), etc., even if a smoothing process through a low-pass filter is performed on an image signal obtained by the single plate CCD, a high-frequency component in the actual image has been folded back into the image. Because of this, moire due to aliasing noise cannot be removed, and consequently, a false color cannot be sufficiently removed.

On the other hand, the method disclosed in the aforementioned Japanese Unexamined Patent Publication No. 9(1997)-214989 is capable of removing a false color effectively. Particularly, this method is based on the assumption that the light-quantity ratio of r:g:b is constant at local regions of an image, and in the case of an analog signal in which the ratio of an R-signal, a G-signal, and a B-signal obtained is proportional to a quantity of light, a false signal in an image signal obtained by a CCD having a Bayer array of pixels can be effectively removed. However, an image signal obtained by a digital camera does not become r:g:b=R:G:B, because, when light quantities r, g, b are converted to a digital R-signal, G-signal, and B-signal, a signal value is represented by an exponential or logarithmic value such as $R=r^{0.45}$ and $R=\log(r)$, in order to reduce quantum errors and input a signal to a video circuit in a computer system. Because of this, the method disclosed in the aforementioned Publication No. 9(1997)-214989 can remove a false color from an analog signal whose signal value is proportional to a quantity of light, but cannot remove a false color in the case where a signal value is represented by an exponential or logarithmic value of a quantity of light. In addition, a false color occurs not only in a single plate CCD having a Bayer array of pixels but also in a single plate CCD having a honeycomb array of pixels.

SUMMARY OF THE INVENTION

The present invention has been made in view of the drawbacks found in the aforementioned methods. Accordingly, it is an object of the invention to provide an image processing method and an image processor which are capable of reducing the occurrence of a false color even if a signal is of any type. Another object of the invention is to provide a computer readable storage medium in which a program for causing a computer to execute the image processing method is stored.

For example, in the case where each signal value, which constitutes image data obtained by an imaging device such as a single plate CCD, is represented by the exponential value or logarithmic value of a light quantity, the image processing method according to the present invention has been made based on the assumption that the differences between signal values become equal at local regions of an image.

In accordance with the present invention, there is provided a method of processing image data,
- the data representing an image that includes a first pixel, a second pixel, and a third pixel that have a first signal value, a second signal value, and a third signal value that have different spectral distributions,
- the first pixel and the second pixel being alternately arrayed in a predetermined direction to form a first line, the first pixel and the third pixel being alternately arrayed in the predetermined direction to form a second line, and the first line and the second line being alternately arrayed in a direction approximately orthogonal to the predetermined direction,
- the method comprising a step of estimating at least one signal value among the first signal value, the second signal value, and the third signal value at all pixel positions, based on the first signal value, the second signal value, and the third signal value,
- wherein the second signal value on the second line is estimated based on a difference between the first signal value and the second signal value on the first line adjacent to the second line.

That is, for instance, when it is assumed that a single plate CCD having a honeycomb array of pixels such as that shown in FIG. 16 has spectral sensitivities corresponding to R, G, and B, image data consisting of color signals (R, G, and B) is obtained. Here, the array of pixels of an image represented by this image data will be described with reference to FIG. 16. Assume that the first through the third pixels and the first through the third signal values correspond to G, R, and B, respectively. The first line is taken to be a GR-line of alternately arraying a G-pixel and an R-pixel from the upper left to the bottom right, while the second line is taken to be a GB line of alternately arraying a G-pixel and a B-pixel in the same direction as the first line. In this case, the image processing method according to the present invention is characterized in that an R-signal value on the GB line is estimated based on the difference between a G-signal and an R-signal on the GR line.

For the purposes of making the present invention more understandable, the first through the third pixels and the first through the third signal values correspond to G, R, and B, respectively. Also, the first line and the second line correspond to the GR line and the GB line, respectively. While, in the following description, reference numerals and characters employed in the embodiment of the present invention shown in FIG. 4 will be applied within parentheses with respect to G, B, and R, the present invention is not to be limited to this array of pixels of an image represented by image data.

In the aforementioned image processing method of the present invention, it is preferable that a second (R06) signal value at the first (G06) pixel on the second (GB) line be estimated based on a difference (R09−G09) between a second (R09) signal value at the second (R09) pixel adjacent to the first (G06) pixel on the first (GR) line, and the first (G09) signal value at the second (R09) pixel computed by performing a one-dimensional interpolation computation on the first (G05, G13) signal value on the first (GR) line.

Also, in this case it is preferable that a second (R06) signal value at the first (G06) pixel on the second (GB) line be estimated by adding the difference (R09−G09) to a first (G06) signal value at the first (G06) pixel on the second (GB) line.

Furthermore, in the image processing method of the present invention, it is preferable that a second (R10) signal value at the third (B10) pixel on the second (GB) line be estimated based on a difference (R13−G13) between a first (G13) signal value at the first (G13) pixel adjacent to the third (B13) pixel on the first (GR) line, and the second (R13) signal value at the first (G13) pixel computed by performing a one-dimensional interpolation computation on the second (R09, R17) signal value on the first line (GR).

In this case it is preferable that a first (G10) signal value at the third (B10) pixel on the second (GB) line be computed by performing a one-dimensional interpolation computation on the first (G06, G14) signal value on the second (GB) line, and it is also preferable that a second (R10) signal value at the third (B10) pixel on the second (GB) line be estimated by adding the difference (R13−G13) to the computed first (G10) signal value.

Furthermore, in the image processing method of the present invention, it is preferable that the difference be an average value of the differences (e.g., R09−G09, R03−G03, etc.) on the two first (GR) lines adjacent to the second (GB) line.

Moreover, in the image processing method of the present invention, it is preferable that the third (B) signal value on the first (GR) line be estimated based on a difference between the first (G) signal value and the third (B) signal value on the second (GB) line adjacent to the first (GR) line.

Also, in this case it is preferable that a third (B13) signal value at the first (G13) pixel on the first (GR) line be estimated based on a difference (B10−G10) between a third (B10) signal value at the third (B10) pixel adjacent to the first (G13) pixel on the second (GB) line, and the first (G10) signal value at the third (B10) pixel computed by performing a one-dimensional interpolation computation on the first (G06, G14) signal value on the second (GB) line.

Furthermore, in this case it is preferable that a third (B13) signal value at the first (G13) pixel on the first (GR) line be estimated by adding the difference (B10−G10) to a first (G13) signal value at the first (G13) pixel on the first (GR) line.

In addition, in the image processing method of the present invention, it is preferable that a third (B13) signal value at the second (R09) pixel on the first (GR) line be estimated based on a difference (B06−G06) between a first (G06) signal value at the first (G06) pixel adjacent to the second (R09) pixel on the second (GB) line, and the third (B06) signal value at the first (G06) pixel computed by performing a one-dimensional interpolation computation on the third (B02, B10) signal value on the second (GB) line.

In this case it is preferable that a first (G09) signal value at the second (R09) pixel on the first (GR) line be computed by performing a one-dimensional interpolation computation on the first (G05, G13) signal value on the first (GR) line, and it is also preferable that a third (B09) signal value at the second (R09) pixel on the first (GR) line be estimated by adding the difference (B06−G06) to the computed first (G09) signal value.

In addition, it is preferable that the difference be an average value of the differences (e.g., B10–G10, B16–G16, etc.) on the two second (GB) lines adjacent to the first (GR) line.

Furthermore, in the image processing method of the present invention, it is preferable that when, in a direction (direction of arrow B) orthogonal to the predetermined direction (direction of arrow A), the first (G) and second (B) pixels are alternately arrayed and the first (G) and third (B) pixels are alternately arrayed so that the first (GR) line and the second (GB) line are formed in the orthogonal direction, at least one signal value among the first signal value, the second signal value, and the third signal value be estimated by switching the first and second lines in the predetermined direction and the first and second lines in the orthogonal direction in accordance with a pixel position for estimating a 10, signal value.

In this case it is preferable that the aforementioned switching be performed based on a scale value which represents a direction of a change in a signal value at the pixel position for estimating a signal value.

The words "scale value" refer to the direction of a change in a signal value at a pixel position for estimating a signal value. For example, the scale value can be represented by the quantity of a change in a signal value at a pixel position adjacent to a pixel position for estimating a signal value, in the aforementioned predetermined direction and the aforementioned orthogonal direction.

Furthermore, in the image processing method of the present invention, it is preferable that when, in a direction (direction of arrow B) orthogonal to the predetermined direction (direction of arrow A), the first (G) and second (B) pixels are alternately arrayed and the first (G) and third (B) pixels are alternately arrayed so that the first (GR) line and the second (GB) line are formed in the orthogonal direction, a predetermined-direction estimated value, based on the first and second lines in the predetermined direction, be computed and an orthogonal-direction estimated value based on the first and second lines in the orthogonal direction is computed. It is also preferable that at least one signal value among the first signal value, the second signal value, and the third signal value be estimated, by weighting and adding the predetermined-direction estimated value and the orthogonal-direction estimated value by a predetermined weighting coefficient in accordance with a pixel position for estimating a signal value.

In this case it is preferable that the predetermined weighing coefficient be computed based on a scale value which represents a direction of a change in a signal value at the pixel position for estimating a signal value.

Here, the "predetermined-direction estimated value" and the "orthogonal-direction estimated value" refer to at least one signal value among the first through the third signal values estimated in the predetermined direction and the orthogonal direction.

In addition, in the image processing method of the present invention, it is preferable that an array of pixels on the first (GR) line relatively shift out of position by approximately one-half a pixel in the predetermined direction with respect to an array of pixels on the second (GB) line so that the first, second, and third pixels are arrayed checkerwise.

In the case of such an array of pixels, it is preferable that signal values at all pixel positions be estimated and that signal values at vacant pixel positions be estimated based on the estimated signal values.

Here, the words "vacant pixel position" mean a position that can be regarded as a position having no signal value, such as a pixel position between R and B or between G and G in the horizontal direction of FIG. 16, when a honeycomb array of pixels in a single plate CCD, such as the one shown in FIG. 16, is taken to be a square array of pixels.

In the image processing method according to the present invention, it is preferable that the first signal value, the second signal value, and the third signal value be any color signal of green, blue, and red, respectively. It is also preferable that the first signal value, the second signal value, and the third signal value be any color signal of yellow, green, and cyan, respectively.

Moreover, in the image processing method of the present invention, the aforementioned image data may be obtained by an imaging device having an imaging surface. In this case the imaging surface is formed by arraying a first photoelectric conversion element, a second photoelectric conversion element, and a third photoelectric conversion element having different spectral sensitivities, on a single surface. The first and second photoelectric conversion elements are alternately arrayed in a predetermined direction to form a first line, and the first and third photoelectric conversion elements are alternately arrayed in the predetermined direction to form a second line. The first line and the second line are alternately arrayed a direction approximately orthogonal to the predetermined direction.

In accordance with the present invention, there is provided a second method of processing image data, the data representing an image that includes a first pixel, a second pixel, and a third pixel that have a first signal value, a second signal value, and a third signal value that have different spectral distributions, the first pixel and the second pixel being alternately arrayed in a predetermined direction to form a first line, the first pixel and the third pixel being alternately arrayed in the predetermined direction to form a second line, and the first line and the second line being alternately arrayed in a direction approximately orthogonal to the predetermined direction, the method comprising the steps of:

obtaining estimated data by estimating at least one signal value among the first signal value, the second signal value, and the third signal value at all pixel positions on the image, by the method as set forth in any one of claims 1 through 36;

generating a high-frequency brightness signal which represents brightness information of a high frequency of the image data;

converting the estimated image data to an estimated brightness signal and an estimated color difference signal which represent brightness information and color difference information of the estimated image data;

obtaining an added brightness signal by adding the estimated brightness signal and the high-frequency brightness signal; and employing the added brightness signal and the estimated color difference signal as a brightness color-difference signal of the image data.

Here, the method of generating a high-frequency brightness signal from image data can adopt a method of employing the first through the third signal values constituting image data, as they are, as brightness signals and performing a filtering process on the brightness signals through a high-pass filter, or methods disclosed, for example, in Japanese Unexamined Patent Publication Nos. 5(1993)-228108, 6(1994)-30444, 6(1994)-225343, and 8(1996)-9199.

In the aforementioned second method according to the present invention, it is preferable that the high-frequency brightness signal be generated by performing a filtering process on the image data through a high-pass filter for cutting a frequency component of a frequency band of the estimated brightness signal.

Also, in the aforementioned second method according to the present invention, it is preferable that the high-frequency brightness signal be generated by performing a filtering process on the image data through a band-pass filter having a predetermined passband characteristic.

Here, the words "predetermined passband characteristic" mean, for example, a characteristic of cutting a frequency component of a frequency band corresponding to the noise component of image data.

In accordance with the present invention, there is provided an image processor for processing image data, the data representing an image that includes a first pixel, a second pixel, and a third pixel that have a first signal value, a second signal value, and a third signal value that have different spectral distributions, the first pixel and the second pixel being alternately arrayed in a predetermined direction to form a first line, the first pixel and the third pixel being alternately arrayed in the predetermined direction to form a second line, and the first line and the second line being alternately arrayed in a direction approximately orthogonal to the predetermined direction, the image processor comprising estimation means for estimating at least one signal value among the first signal value, the second signal value, and the third signal value at all pixel positions, based on the first signal value, the second signal value, and the third signal value, wherein the estimation means estimates the second signal value on the second line, based on a difference between the first signal value and the second signal value on the first line adjacent to the second line.

In the image processor according to the present invention, it is preferable that the estimation means estimate a second signal value at the first pixel on the second line, based on a difference between a second signal value at the second pixel adjacent to the first pixel on the first line, and the first signal value at the second pixel computed by performing a one-dimensional interpolation computation on the first signal value on the first line.

In this case it is preferable that the estimation means estimate a second signal value at the first pixel on the second line, by adding the difference to a first signal value at the first pixel on the second line.

In addition, in the image processor according to the present invention it is preferable that the estimation means estimate a second signal value at the third pixel on the second line, based on a difference between a first signal value at the first pixel adjacent to the third pixel on the first line, and the second signal value at the first pixel computed by performing a one-dimensional interpolation computation on the second signal value on the first line.

In this case the estimation means may compute a first signal value at the third pixel position on the second line, by performing a one-dimensional interpolation computation on the first signal value on the second line, and may also estimate a second signal value at the third pixel position by adding the difference to the computed first signal value.

Also, the difference may be an average value of the differences on the two first lines adjacent to the second line.

In addition, in the image processor according to the present invention, it is preferable that the estimation means estimate the third signal value on the first line, based on a difference between the first signal value and the third signal value on the second line adjacent to the first line.

In this case it is preferable that the estimation means estimate a third signal value at the first pixel on the first line, based on a difference between a third signal value at the third pixel adjacent to the first pixel on the second line, and the first signal value at the third pixel computed by performing a one-dimensional interpolation computation on the first signal value on the second line.

Also, in this case it is preferable that the estimation means estimate a third signal value at the first pixel on the first line, by adding the difference to a first signal value at the first pixel on the first line.

In addition, in the image processor according to the present invention, it is preferable that the estimation means estimate a third signal value at the second pixel on the first line, based on a difference between a first signal value at the first pixel adjacent to the second pixel on the second line, and the third signal value at the first pixel computed by performing a one-dimensional interpolation computation on the third signal value on the second line.

In this case the estimation means may compute a first signal value at the second pixel position on the first line, by performing a one-dimensional interpolation computation on the first signal value on the first line, and may also estimate a third signal value at the second pixel position, by adding the difference to the computed first signal value.

Also, it is preferable that the estimation means compute the difference as an average value of the differences on the two second lines adjacent to the first line.

Furthermore, in the image processor according to the present invention, it is preferable that when, in a direction orthogonal to the predetermined direction, the first and second pixels are alternately arrayed and the first and third pixels are alternately arrayed so that the first line and the second line are formed in the orthogonal direction, the estimation means estimates at least one signal value among the first signal value, the second signal value, and the third signal value, by switching the first and second lines in the predetermined direction and the first and second lines in the orthogonal direction in accordance with a pixel position for estimating a signal value.

In this case it is preferable that the aforementioned switching be performed based on a scale value which represents a direction of a change in a signal value at the pixel position for estimating a signal value.

Furthermore, in the image processor according to the present invention, it is preferable that when, in a direction orthogonal to the predetermined direction, the first and second pixels are alternately arrayed and the first and third pixels are alternately arrayed so that the first line and the second line are formed in the orthogonal direction, the estimation means comprise means for computing a predetermined-direction estimated value based on the first and second lines in the predetermined direction and an orthogonal-direction estimated value based on the first and second lines in the orthogonal direction, and means for estimating at least one signal value among the first signal value, the second signal value, and the third signal value, by weighting and adding the predetermined-direction estimated value and the orthogonal-direction estimated value by a predetermined weighting coefficient in accordance with a pixel position for estimating a signal value.

In this case it is preferable that the predetermined weighing coefficient be computed based on a scale value which represents a direction of a change in a signal value at the pixel position for estimating a signal value.

In addition, in the image processor according to the present invention, it is preferable that an array of pixels on the first line relatively shift out of position by approximately one-half a pixel in the predetermined direction with respect to an array of pixels on the second line so that the first, second, and third pixels are arrayed checkerwise.

In this case it is preferable that the estimation means estimate signal values at all pixel positions and also estimates signal values at vacant pixel positions, based on the estimated signal values.

In the image processor according to the present invention, it is preferable that the first signal value, the second signal value, and the third signal value be any color signal of green, blue, and red, respectively. It is also preferable that the first signal value, the second signal value, and the third signal value be any color signal of yellow, green, and cyan, respectively.

Also, in the image processor according to the present invention, it is preferable that the image data be obtained by an imaging device having an imaging surface. In this case the imaging surface is formed by arraying a first photoelectric conversion element, a second photoelectric conversion element, and a third photoelectric conversion element having different spectral sensitivities, on a single surface. The first and second photoelectric conversion elements are alternately arrayed in a predetermined direction to form a first line, and the first and third photoelectric conversion elements are alternately arrayed in the predetermined direction to form a second line. Furthermore, the first line and the second line are alternately arrayed in a direction approximately orthogonal to the predetermined direction.

In accordance with the present invention, there is a second image processor for processing image data, the data representing an image that includes a first pixel, a second pixel, and a third pixel that have a first signal value, a second signal value, and a third signal value that have different spectral distributions, the first pixel and the second pixel being alternately arrayed in a predetermined direction to form a first line, the first pixel and the third pixel being alternately arrayed in the predetermined direction to form a second line, and the first line and the second line being alternately arrayed in a direction approximately orthogonal to the predetermined direction, the image processor comprising:

interpolation means for obtaining estimated image data by estimating at least one signal value among the first signal value, the second signal value, and the third signal value at all pixel positions on the image, by the image processor as set forth in any one of claims 40 through 71;

high-frequency brightness signal generation means for generating a high-frequency brightness signal which represents brightness information of a high frequency of the image data;

brightness color-difference conversion means for converting the estimated image data to an estimated brightness signal and an estimated color difference signal which represent brightness information and color difference information of the estimated image data; and addition means for obtaining an added brightness signal by adding the estimated brightness signal and the high-frequency brightness signal;

wherein the added brightness signal and the estimated color difference signal are employed as a brightness color-difference signal of the image data.

In the second image processor according to the present invention, it is preferable that the high-frequency brightness signal generation means generate the high-frequency brightness signal by performing a filtering process on the image data through a high-pass filter for cutting a frequency component of a frequency band of the estimated brightness signal.

In addition, in the second image processor according to the present invention, it is preferable that the high-frequency brightness signal generation means generate the high-frequency brightness signal by performing a filtering process on the image data through a band-pass filter having a predetermined passband characteristic.

Note that a program for causing a computer to execute the image processing method and image processor of the present invention may be stored in a computer readable storage medium. Also, the image processor of the present invention may be provided in an output device such as a printer, etc.

According to the image processing method and the image processor of the present invention, when a signal value constituting image data is represented by an exponential value or logarithmic value with respect to a quantity of light, a signal value at each pixel position is computed based on the assumption that the difference between RGB-signals is constant at local regions of an image represented by image data. Therefore, even if a signal value constituting image data is represented by an exponential value or logarithmic value, signal values at all pixel positions can be computed without the occurrence of a false color. As a result, the present invention is capable of obtaining an image with no false color and with high resolution.

In addition, a signal value at each pixel position is computed by weighting and adding signal values computed in a predetermined direction and a direction orthogonal to the predetermined direction, in accordance with a direction in which a signal value changes. As a result, the occurrence of a false color can be prevented regardless of the direction of a change in a signal value, and the occurrence of an artifact can also be prevented.

Furthermore, when pixels are arrayed checkerwise, signal values at pixels arrayed in square form can be computed by computing signal values at vacant pixel positions.

Moreover, in accordance with a second image processing method and image processor of the present invention, estimated image data is obtained, by estimating at least one signal value among the first signal value, the second signal value, and the third signal value at all pixel positions of an image represented by image data by the first image processing method and image processor of the present invention. A high-frequency brightness signal representing the brightness information of a high frequency of image data is generated and the estimated image data is converted to an estimated brightness signal and an estimated color difference signal, which represent the brightness information and color difference information of the estimated image data. Also, an added brightness signal is obtained by adding the estimated brightness signal and the high-frequency brightness signal. Here, since the occurrence of a false color in the estimated image data has been reduced, the image of a scene from which image data is acquired can be reproduced without the occurrence of a false color. On the other hand, while the high frequency component of image data represents with fidelity the high frequency component of a scene from which image data is acquired, a false color is contained in the low frequency component. Therefore, the high-frequency brightness signal which represents the brightness information of the high frequency of image data becomes a signal that represents the high frequency component of a scene with fidelity. For this reason, the added brightness signal, obtained by adding the high-frequency brightness signal and the estimated brightness signal, represents the high frequency component of a scene with fidelity, and for the low frequency component, the occurrence of a false color has been reduced. As a result, an image with higher resolution can be obtained by reproducing the image, based on the added brightness signal and the estimated color difference signal.

Assuming the ratio of the first signal value, the second signal value, and the third signal value does not change sharply independently of positions on an image, the second image processing method and image processor of the present invention is capable of obtaining an image having even higher resolution. However, when a change in the above-mentioned ratio is great, a false signal is contained in the high-frequency brightness signal. Therefore, if the added brightness signal is generated from this high-frequency brightness signal and if an image is reproduced by the added brightness signal and the estimated color difference signal, gray noise will appear in the image. Therefore, in such a case, if the high-frequency brightness signal is generated by the use of a band-pass filter for cutting the frequency component of a frequency band corresponding to the gray noise component, gray noise can be reduced and image resolution can also be enhanced.

BRIEF DESCRIPTION OF THE DRAWINGS

The above and other objects and advantages will become apparent from the following detailed description when read in conjunction with the accompanying drawings wherein:

FIGS. 2A and 2B are diagrams showing the pixel array of the single plate CCD employed in the first embodiment;

FIG. 3 is a diagram showing the pixel array of the single plate CCD having honeycomb array;

FIG. 10 is a diagram showing another example of the checkers-square filter;

FIG. 16 is a diagram showing a honeycomb array of pixels;

FIG. 17 is a diagram showing a Bayer array of pixels; and

FIG. 18 is a diagram showing the pixel positions of the Bayer array represented by reference numerals.

DESCRIPTION OF THE PREFERRED EMBODIMENTS

Figure 1:
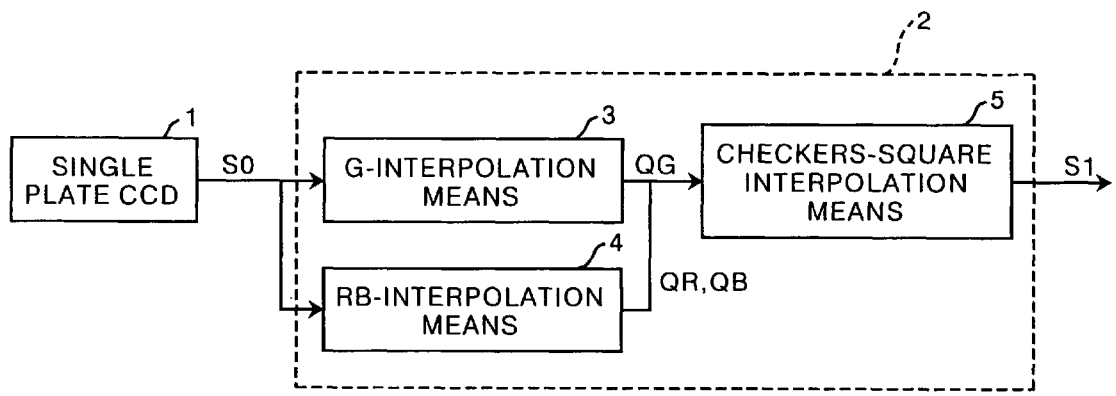
FIG. 1 is a block diagram showing an image processor constructed according to a first embodiment of the present invention.

Referring now in greater detail to the drawings and initially to FIG. 1, there is shown an image processor in accordance with a first embodiment of the present invention. The image processor according to the first embodiment performs an interpolating process on a signal value obtained by each photoelectric conversion element constituting a single plate CCD 1, thereby obtaining a signal value at all pixel positions. For this reason, the image processor includes interpolation means 2 for obtaining interpolated image data S1 by performing an interpolating process on image data S0 constructed of the signal values. The interpolation means 2 comprises G-interpolation means 3 for computing a G-signal QG by performing an interpolation computation in a manner to be described later, RB-interpolation means 4 for computing an R-signal QR and a B-signal QB, and checkers-square interpolation means 5 for computing a signal value at a vacant pixel position (*) shown in FIG. 3 from the G-signal QG, the R-signal QR, and the B-signal QB. While, in the single plate CCD 1 shown in FIG. 1, an analog signal is obtained from each photoelectric conversion element constituting the CCD 1, the image data S0 in the first embodiment is a digital signal converted from an analog signal. Also, the analog signal from CCD 1 is converted to this digital signal (image data S0) so that the value of the digital signal becomes the 0.45 power or logarithmic value of a light quantity that is input to the single plate CCD 1.

The image processor according to the first embodiment may be provided in an imaging device like a digital camera, or a reader such as a scanner for reading an image from film. It may also be provided in a reproducer, such as a monitor, a printer, etc., which reproduces an image signal obtained by an imaging device, etc. Furthermore, it may also be employed singly as an image processor.

Figures 2A, 2B, 3:
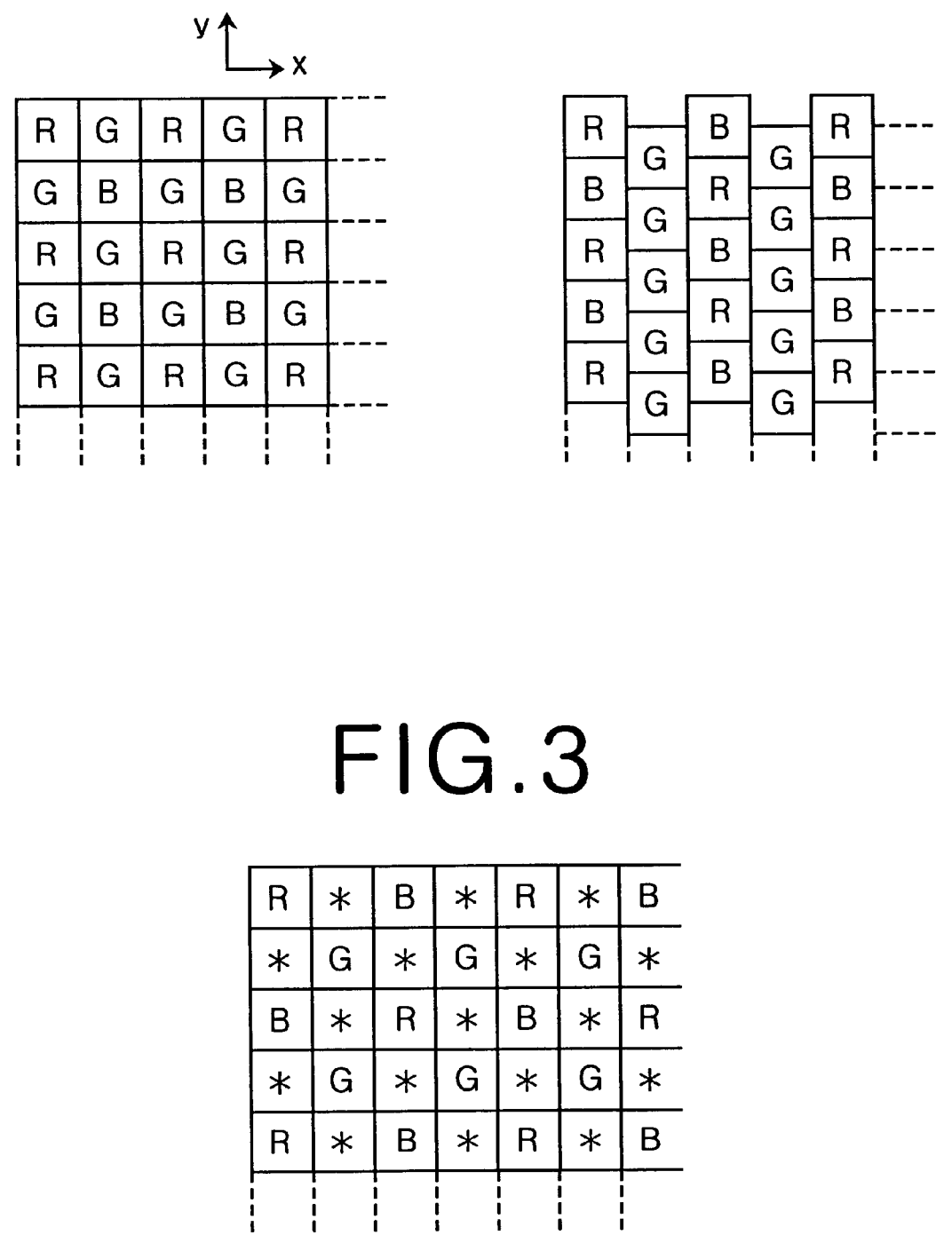

FIG. 2 shows the pixel array of the single plate CCD 1 employed in the first embodiment. The pixel array shown in FIG. 2A is a square array of pixels, in which a first line of alternately arraying pixels corresponding to an R-channel and a G-channel in the y-direction and a second line of alternately arraying pixels corresponding to a G-channel and a B-channel in the y-direction are alternately arrayed in the x-direction, and similarly a line of alternately arraying an R-channel and a G-channel and a line of alternately arraying a G-channel and a B-channel are alternately arrayed in the y-direction. As an example of such a square pixel array, a Bayer array shown in FIG. 17 is known. In the first embodiment, the pixel array shown in FIG. 2A is referred to as a Bayer array.

The pixel array shown in FIG. 2B is a checkered pixel array, in which even lines of alternately arraying pixels corresponding to an R-channel and a G-channel in the y-direction and odd lines of arraying pixels corresponding to G-channels in the y-direction are arrayed so that the odd and even lines shift out of position from each other by approximately one-half the pixel interval in the y-direction. As such a checkered pixel array, a honeycomb array (FIG. 16) described in the aforementioned Japanese Unexamined Patent Publication No. 10(1998)-136391 is known. In the first embodiment, the pixel array shown in FIG. 2B is referred to as a honeycomb array. In this honeycomb array, viewing in the directions inclined ±45 degrees with respect to the x-direction, lines of alternately arraying pixels corresponding to an R-channel and a G-channel and lines of alternately arraying pixels corresponding to a G-channel and a B-channel are alternately arrayed in the directions orthogonal to the ±45-degree directions. Note that the honeycomb array is obtained by rotating the Bayer array shown in FIG. 2A through 45 degrees. Also, since pixels of the honeycomb array are arrayed checkerwise, as described above, it is also possible to represent the honeycomb array in square form by the use of vacant pixel positions (*) having no signal value, as shown in FIG. 3. The first embodiment will be described on the assumption that processing is performed on the image data S0 obtained by the single plate CCD 1 having the honeycomb pixel array shown in FIG. 2A, i.e., FIG. 3.

Figure 4:
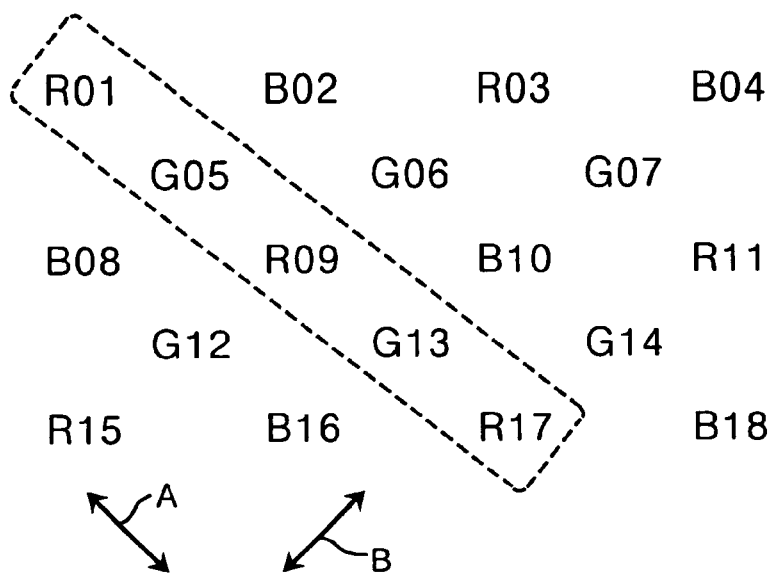
FIG. 4 is a diagram showing the pixel positions of the single plate CCD of the honeycomb array, reference numbers being applied to the pixel positions.

FIG. 4 shows pixel positions on the single plate CCD 1 having the honeycomb pixel array, reference numbers being applied to the pixel positions. Here, the direction from the upper left of FIG. 3 toward the bottom right, i.e., the direction of R01→G05→R09→G13→R17 (direction of arrow A) shown by broken lines in FIG. 4 is taken to be a predetermined direction, and the direction orthogonal to the predetermined direction (i.e., the direction of arrow A) is taken to be a direction of arrow B. Note that the reference number applied to the pixel position is also used as a reference number for a signal value.

Figure 5:
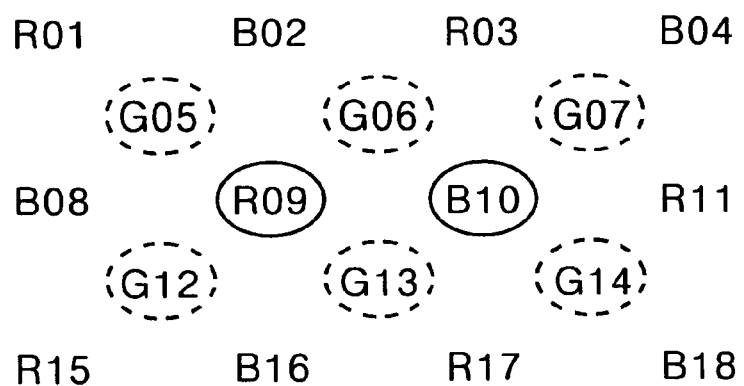
FIG. 5 is a diagram for describing computation of signal values (the first)

(1) First, a description will be given of the process of computing G-signals at R-pixel and B-pixel positions. The computation of the G-signals is performed at the G-interpolation means 3. The G-signals at R-pixel and B-pixel positions can be computed by performing a simple interpolation computation on G-signals obtained at the surrounding G-pixel positions of the R-pixel and B-pixel positions. For instance, a G09-signal at a R09-position and a G10-signal at a B10-position, enclosed by solid lines in FIG. 5, are computed by the following Eqs. (1) and (2), employing the G-signals at the surrounding G-pixel positions enclosed by broken lines.

$$G09=(G05+G06+G12+G13)/4 \quad (1)$$

$$G10=(G06+G07+G13+G14)/4 \quad (2)$$

Note that the G-signals at R-pixel and B-pixel positions may be computed by performing a two-dimensional cubic spline interpolation computation on G-signals obtained at the surrounding 4×4 G-pixels of the R-pixel and B-pixel positions. With this computation, interpolation can be performed without losing the frequency component of aG-signal before interpolation. As a result, G-signals holding the original frequency information can be obtained at all pixel positions. Also, any method may be employed, if it is an interpolation computation in two-dimensional directions (vertical and horizontal directions in FIG. 4).

Figure 6:
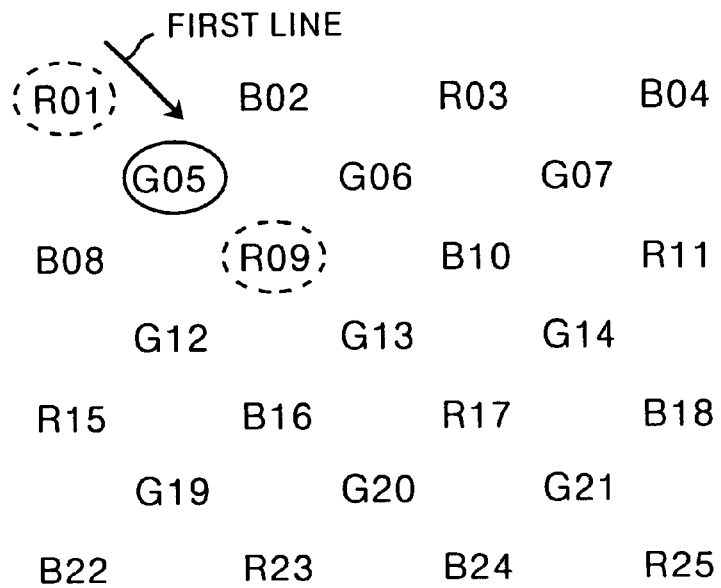
FIG. 6 is a diagram for describing computation of signal values (the second)
Figure 7:
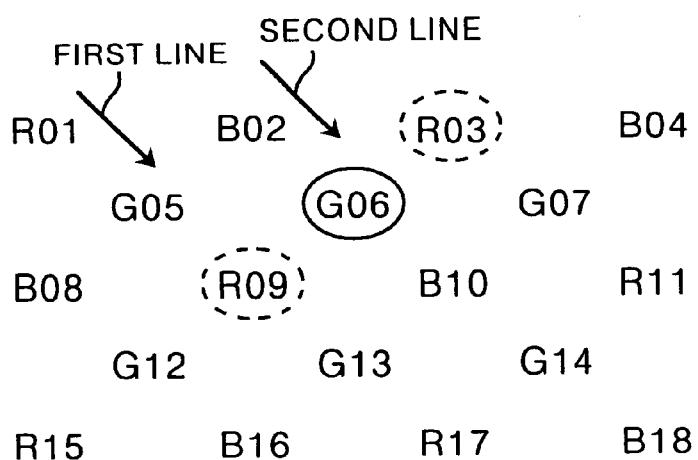
FIG. 7 is a diagram for describing computation of signal values (the third)
Figures 8, 9:
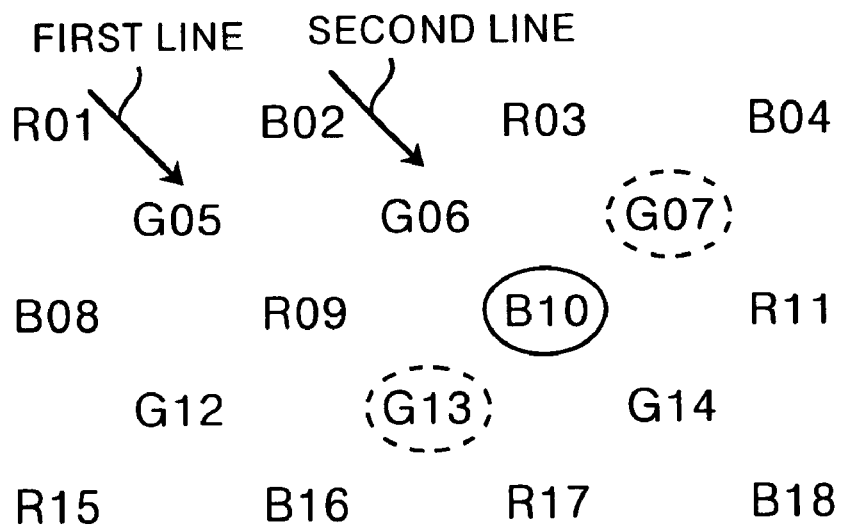
FIG. 8 is a diagram for describing computation of signal values (the fourth)
FIG. 9 is a diagram showing an example of a checkers-square filter.

(2) Next, a description will be given of the process of computing an R-signal at a G-pixel position on a line (hereinafter referred to as a first line) where an R-pixel and a G-pixel are alternately arrayed in a predetermined direction (direction of arrow A). Note that the R-signal computing process after this is performed at the RB-interpolation means 4. This R-signal computing process is done by performing a one-dimensional linear interpolation computation on R-signals on the first line including the G-pixel position. For instance, an R05-signal at a G05-pixel position enclosed by a solid line in FIG. 6 is computed by the following Eq. (3), using an R01-signal and an R09-signal at two R-pixel positions adjacent in the first line direction, enclosed by broken lines.

$$R05=(R01+R09)/2 \quad (3)$$

Note that an R-signal at a G-pixel position may be computed by performing a one-dimensional cubic spline interpolation computation on R-signals obtained at the surrounding 4 (four) R-pixel positions of the G-pixel position on the first line. For example, if a G-pixel position for computing an R-signal value is taken to be G13, the 4 R-pixel positions are R01, R09, R17, and R25. Also, any method can be employed, if it is a one-dimensional interpolation computation in the first line direction. With this method, an R-signal at a G-pixel position on the first line can also be computed.

(3) Next, a description will be given of the process of computing an R-signal at a G-pixel position on a line of B-pixels and G-pixels (hereinafter referred to as a second line). This computing process will be performed as follows:First, on the first line adjacent to the second line where a G-pixel position for computing an R-signal is included, pixel positions adjacent to the G-pixel position are computed. For example, assuming an R06-signal is computed at a G06-pixel position enclosed by a solid line in FIG. 7, the pixel positions adjacent to the G06-pixel position are an R09-pixel position and an R03-pixel position, enclosed by broken lines. In the first embodiment, a signal value at the R09-pixel position is employed. The difference between the R-signal and G-signal at the R09-pixel position is added to the G-signal at the G-pixel position on the second line, and the result of addition is taken to be an R-signal at the G-pixel position. For instance, the R06-signal at the G06-pixel position is computed by the following Eq. (4):

$$R06=G06+(R09-G09) \quad (4)$$

That is, Eq. (4) is determined based on the assumption that the differences between an R-signal and a G-signal at local regions of an image are equal. For example, the fact that the difference between an R-signal and a G-signal at the G06-pixel position equals the difference between an R-signal and a G-signal at the R09-pixel position means that the following relationship is met.

$$R06-G06=R09-G09 \quad (5)$$

If Eq. (5) is solved with respect to the R06-signal, Eq. (4) is obtained. Note that the G09-signal in Eq. (4) is computed not by the aforementioned Eq. (1) but by performing a one-dimensional interpolation computation on G-signals present on the first line including the R09-pixel position, like the linear interpolation computation shown in the following Eq. (6) or a one-dimensional cubic spline interpolation computation.

$$G09=(G05+G13)/2 \quad (6)$$

That is, in the first embodiment, a signal value is computed on the assumption that the differences between an R-signal and a G-signal at local regions of an image are equal to each other, and the lines that are used for computation of a signal value are the second line where the G06-pixel position is present and the first line where the R09-pixel position is present. This means that a signal value is computed based on the correlation between pixel values present on the first and second lines, and there is a need to compute a signal value that reflects changes in signal values in the first and second line directions with respect to unknown signal values. In the aforementioned process (2), the R06-signal at the G06-pixel position on the second line is computed based on the relationship shown in the above-mentioned Eq. (5). However, as the G09-signal is unknown, it needs to be estimated. Also, since Eq. (5) represents the correlation between the first and second lines, a change in a signal value on the first line in the predetermined direction (direction of arrow A) needs to be reflected in order to estimate the G09-signal. On the other hand, it is considered that the G-signal computed by the above-mentioned method (1) is used. However, since the G-signal is computed by employing signal values present on another line, as shown in Eqs. (1) and (2), the G-signal does not reflect a change in a signal value present on the first line. Because of this, in order to reflect a change in a signal value present on the first line, the G-signal is computed by performing a one-dimensional interpolation computation on the first line, as in Eq. (6).

Also, in the case where an R-signal at a G-pixel position is computed based on the difference between an R-signal and a G-signal at a pixel position adjacent to one side of the G-pixel position, the phase of an image will approach in that direction, if a signal value at a pixel position adjacent only to one side is employed. In order to prevent this, as shown in the following Eq. (7), the average value of the differences between an R-signal and a G-signal at pixel positions (e.g., R09-pixel and R03-pixel positions) on both sides of a G-pixel position (e.g., G06-pixel position) that is used for computing an R-signal may be added to the G-signal at the G-pixel position that is used for computing an R-signal, and the result of addition may be used as an R-signal at that G-pixel position.

$$R06=G06+((R09-G09)+(R03-G03))/2 \qquad (7)$$

With this Eq. (7), an R-signal at a G-pixel position on the second line can be computed.

(4) Next, a description will be given of the process of computing an R-signal at a B-pixel position on the second line of B-pixels and G-pixels. This computing process will be performed as follows:First, on the first line adjacent to the second line where a B-pixel position for computing an R-signal is included, pixel positions adjacent to the B-pixel position are computed. For example, assuming an R10-signal is computed at a B10-pixel position enclosed by a solid line in FIG. 8, the pixel positions adjacent to the G06-pixel position are a G13-pixel position and a G07-pixel position, enclosed by broken lines. In the first embodiment, a signal value at the G13-pixel position is employed. The difference between the R-signal and G-signal at the G13-pixel position is added to the G-signal at the G-pixel position on the second line, and the result of addition is taken to be an R-signal at the B-pixel position. For instance, the R10-signal at the B10-pixel position is computed by the following Eq. (8):

$$R10=G10+(R13-G13) \qquad (8)$$

That is, Eq. (8), as with Eq. (4), is determined based on the assumption that the differences between an R-signal and aG-signal at local regions of an image are equal. For example, the fact that the difference between an R-signal and a G-signal at the B10-pixel position equals the difference between an R-signal and G-signal at the G13-pixel position means that the following relationship is met.

$$R10-G10=R13-G13 \qquad (9)$$

If Eq. (9) is solved with respect to the R10-signal, Eq. (8) is obtained. Note that the G09-signal in Eq. (9) is computed not by the aforementioned Eq. (1) but by performing a one-dimensional interpolation computation on G-signals present on the second line including the R09-pixel position, like the linear interpolation computation shown in the following Eq. (10) or a one-dimensional cubic spline interpolation computation, in order to compute an R-signal.

$$G10=(G06+G14)/2 \qquad (10)$$

Also, the R13-signal in Eq. (9), as with the above-mentioned Eq. (10), is computed by performing a one-dimensional interpolation computation with respect to R-signals on the first line where the G13-pixel position is present.

$$R13=(R09+R17)/2 \qquad (11)$$

In this case, as with the above-mentioned Eq. (7), as shown in the following Eq. (12), the average value of the differences between an R-signal and a G-signal at pixel positions (e.g., G13-pixel and G07-pixel positions) on both sides of a B-pixel position (e.g., B10-pixel position) that is used for computing an R-signal may be added to the G-signal at the B-pixel position that is used for computing an R-signal, and the result of addition may be used as an R-signal at that B-pixel position.

$$R10=G10+((R13-G13)+(R07-G07))/2 \qquad (12)$$

With this Eq. (12), an R-signal at a B-pixel position on the second line can be computed.

$$R10=G10+((R13-G13)+(R07-G07))/2 \qquad (12)$$

Also, by performing the above-mentioned processes (1) through (4), R-signals at all pixel positions where no R-signal is present can be computed.

While the computation of an R-signal at each pixel position has been described, a B-signal at each G-pixel position on the second line of B- and G-pixels, a B-signal at each G-pixel position on the first line of R-pixels and G-pixels, and a B-signal at each R-pixel position on the first line of R-pixels and G-pixels can also be computed in the same manner as an R-signal, as described in the above-mentioned processes (2) through (4). Thus, B-signals at all pixel positions where no B-signal is present can be computed.

Note that if, in the single plate CCD 1 having the Bayer pixel array shown in FIG. 2A, the pixel array is rotated 45 degrees, the resultant array is the same as the honeycomb array shown in FIG. 2B, if vacant pixel positions (*) are excluded. Therefore, if, in the above-mentioned description, the predetermined direction is taken to be the vertical direction in FIG. 2 and the direction orthogonal to the predetermined direction is taken to be the horizontal direction in FIG. 2, RGB-signals at all pixel positions can be computed even in the case of the Bayer array, as in the case of the honeycomb array.

If the signal values QR, QG, and QB of all RGB-signals at all pixel positions are obtained in the aforementioned manner, the checkers-square interpolation means 5 computes RGB-signal values at the vacant pixel positions (*) by an interpolation computation, thereby obtaining interpolated image signal Si in which pixels are arrayed in square form. This interpolation computation can be performed by employing an interpolation filter, such as that shown in FIG. 9, which employs the signal values of the 4 surrounding pixel positions of a vacant pixel position (*), or by employing an interpolation filter which has the disposition of interpolation coefficients rotated 45 degrees from the disposition of the interpolation coefficients of an interpolation filter for performing a two-dimensional cubic spline interpolation computation on 4×4 pixels, as shown in FIG. 10. Note that the interpolation computation for computing a signal value at this vacancy pixel position (*) is referred to as a checkers-square interpolation computation. Also, the present invention is not limited to these interpolation computations. For example, the RGB-signals at each pixel position, obtained in the above-mentioned manner, may be converted to a YCC brightness color-difference space, and an interpolation computation by a different interpolation filter may be performed for each YCC. That is, any method can be adopted, if it is an interpolation computation for computing a signal value at a vacancy pixel position (*).

Now, the operation of the first embodiment will be described with reference to FIG. 11. First, a subject is photographed and image data S0 is obtained by the single plate CCD 1 (step S1). Then, a G-signal QG at an R- or B-pixel position in the predetermined direction is computed according to the aforementioned process (1) by the G-interpolation means 3 (step S2). Next, a signal to be computed is set to an R-signal (step S3), and an R-signal QR at a G-pixel position on the first line is computed according to the aforementioned process (2) by the RB-interpolation means 4 (step S4). Similarly, the computation of an R-signal QR at a G-pixel position on the second line is performed according to the aforementioned process (3) (step S5) and the computation of an R-signal QR at a B-pixel position on the second line is performed according to the aforementioned process (4) (step S6). It is judged whether or not all R-signals and B-signals have been computed (step S7). When the judgement in step S7 is NO, in step S8 a signal to be computed is set to a B-signal and the process returns to step 4. Steps S4 through S7 are repeated to compute B-signals QB.

When the judgement in step S7 is "YES," RGB-signals QR, QG, and QB have been computed at all pixel positions. Using the interpolation filter shown in FIG. 9 or 10, a checkers-square interpolation computation is performed on the signal value of each pixel, and a signal value at each vacant pixel position (*) shown in FIG. 3 is computed by a checkers-square interpolation computation (step S9). In this manner the process ends.

With the aforementioned process, the RGB-signals at all the pixel positions in the honeycomb array, shown in FIG. 2A, of the single plate CCD 1 can be obtained. Thus, interpolated image data S1 with RGB-signals at each pixel position can be obtained.

Figure 11:
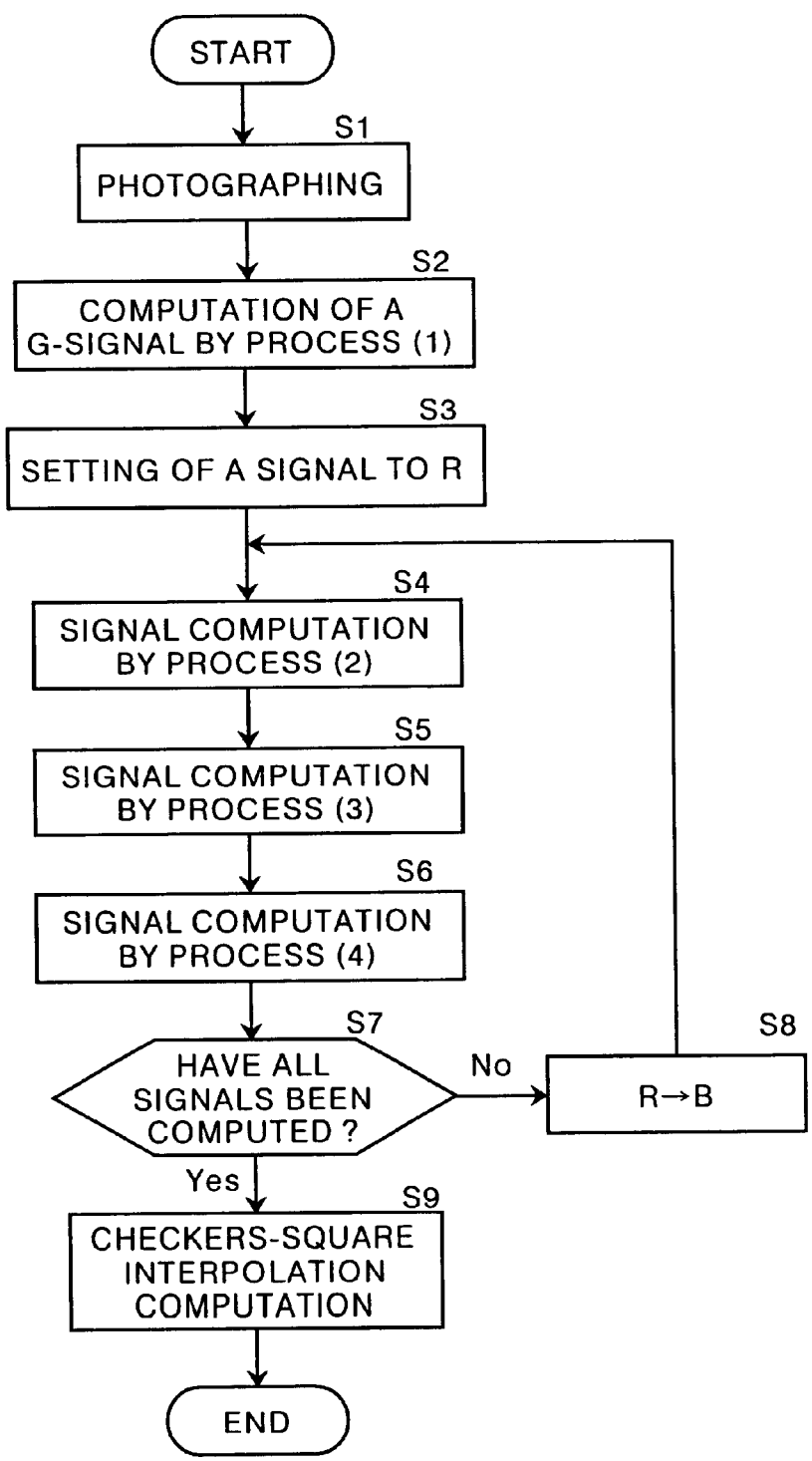
FIG. 11 is a flowchart showing the operation of the first embodiment.

While, in step S3 of the flowchart shown in FIG. 11, a signal to be computed is set to an R-signal, it may be set to a B-signal prior to an R-signal. In this case, if the judgement in step S7 is NO, in step S8 a signal to be computed is set from a B-signal to an R-signal.

According to the first embodiment, as described above, a signal value at each pixel position is computed, assuming the difference between RGB-signal values is constant at local regions of an image. Therefore, even in the case where the signal values obtained by the single plate CCD 1 are represented by exponential or logarithmic values, the signal values at all pixel positions can be obtained without generating any false color. Thus, the first embodiment is capable of obtaining interpolated image data S1 from which a high-resolution image with no false color is reproducible.

In the aforementioned processes (1) through (4), a signal value at each pixel position in the predetermined direction (direction of arrow A) is obtained by performing a one-dimensional interpolation computation, as shown in Eqs. (6) and (10), and with this signal value, a signal value is further estimated on the assumption that the difference between a G-signal and an R-signal and the difference between a G-signal and a B-signal at pixel positions adjacent in the direction of arrow B orthogonal to the direction arrow A are constant, as shown in the above-mentioned Eqs. (5) and (9). Therefore, the above-mentioned method can prevent a false color from occurring in an image region where a change in each color (red, green, and blue) is not too great in the direction of arrow A. If, on the other hand, the direction of arrow B is taken to be the predetermined direction, a false color can be prevented by the same processes as the above-mentioned processes (1) through (4) from occurring in an image region where a change in each color (red, green, and blue) is not too great from the upper right direction to the bottom left direction. However, if processing is performed with either the aforementioned direction of arrow A or arrow B regarded as the predetermined direction for computing a signal value, the occurrence of a false color cannot be reduced when a change in each color is great in this predetermined direction.

Therefore, the occurrence of a false color can be prevented regardless of a change in a signal value, by detecting a change quantity of each pixel value of an image represented by image data S0, switching the predetermined direction for computing a signal value to the direction of arrow A and the direction of arrow B in accordance with the direction of a change in a pixel value, and computing the signal value of each color (R, G, and B) at all pixel positions. In this method, however, there is a possibility that an artifact will occur, because the processing direction changes at a boundary portion where a pixel value changes. A method for coping with this will hereinafter be described as a second embodiment of the present invention.

Figure 12:
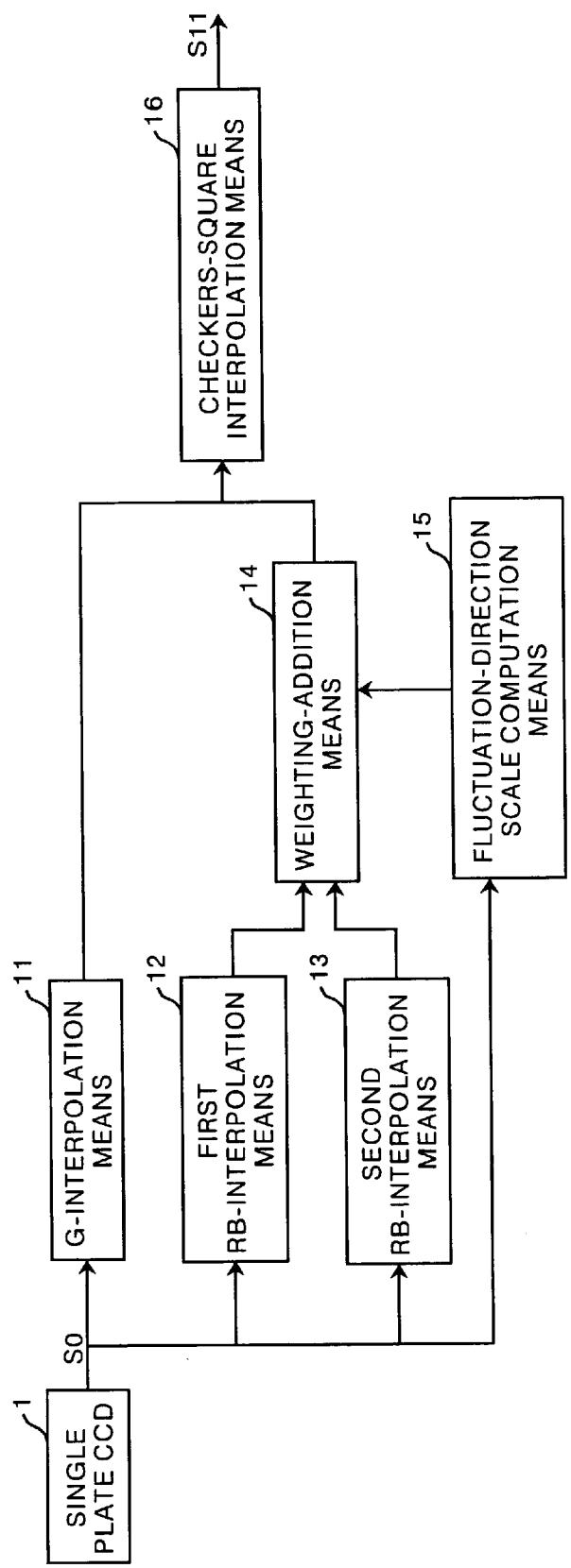
FIG. 12 is a block diagram showing an image processor constructed according to a second embodiment of the present invention.

FIG. 12 illustrates an image processor constructed according to the second embodiment of the present invention. As shown in the figure, the image processor according to the second embodiment comprises (1) G-interpolation means 11 for computing G-signals at an R-pixel position and a B-pixel position by the above-mentioned Eq. (1) or (2), based on image data S0 obtained by a single plate CCD 1; (2) first RB-interpolation means 12 for computing R-signals and B-signals at all pixel positions by the above-mentioned processes (2) through (4), with the direction of arrow A in FIG. 4 regarded as a predetermined direction; (3) second RB-interpolation means 13 for computing R-signals and B-signals at all pixel positions by the above-mentioned processes (2) through (4), with the direction of arrow B regarded as the predetermined direction; (4) weighting-addition means 14 for weighting and adding the R-signals and B-signals obtained by the first RB-interpolation means 12 and the second RB-interpolation means 13; (5) fluctuation-direction scale computation means 15 for computing the scale of the direction of a fluctuation in a pixel value of an image; and (6) checkers-square interpolation means 16 for computing signal values at vacant pixel positions (*) from RGB-signals at all pixel positions.

Note that for G-signals, as shown in the above-mentioned Eqs. (1) and (2), signal values at all pixel positions can be computed independently of the processing direction, so the G-interpolation means 11 can compute G-signals without taking the processing direction into consideration, as with the G-interpolation means 3 shown in FIG. 1.

Also, the process to be performed in the first and second RB-interpolation means 12, 13 of the second embodiment differs only in data-processing direction from that in the RB-interpolation means 4 shown in FIG. 1 and the process to be performed in the checkers-square interpolation means 16 of the second embodiment is the same as that in the checkers-square interpolation means 5 of the first embodiment, so a detailed description thereof is omitted.

Figure 13:
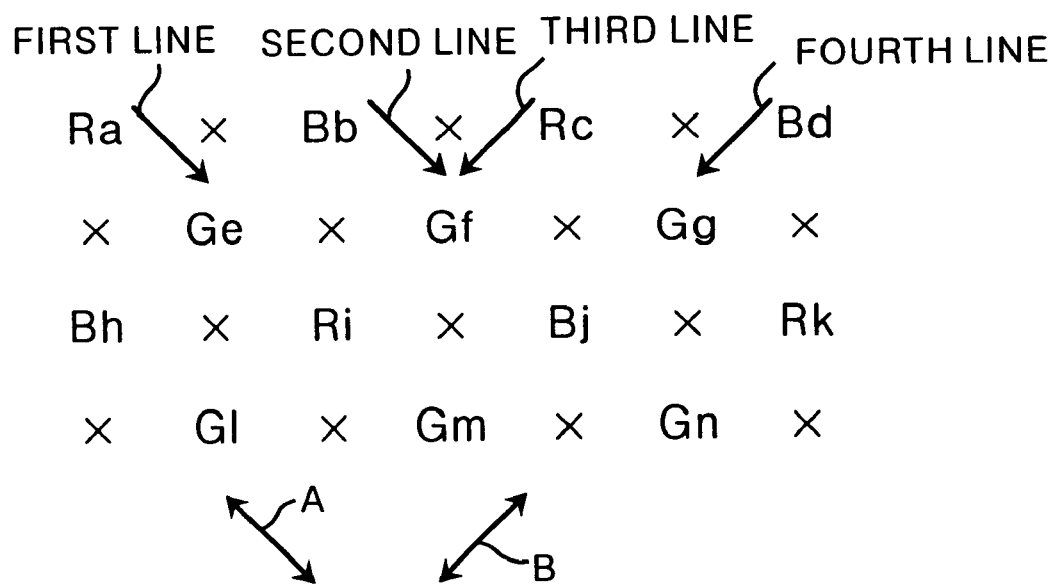
FIG. 13 is a diagram showing the pixel positions of the single plate CCD of the honeycomb array of the second embodiment, reference numbers being applied to the pixel positions.

First, a description will be made of the process that is performed in the fluctuation-direction scale computation means 15. The second embodiment, as with the first embodiment, uses a single plate CCD 1 having a honeycomb array of pixels such as the one shown in FIG. 3. Reference characters are applied to the pixel positions, as shown in FIG. 13. In the figure, a line of Ra, Ge, Ri, and Gn extending in the direction of arrow A is taken to be a first line, and a line of Bb, Gf, Bj, and Gn likewise extending in the direction of arrow A is taken to be a second line. A line of Rc, Gf, Ri, and Gl extending in the direction of arrow B is taken to be a third line, and a line of Bd, Gg, Bj, and Gm likewise extending in the direction of arrow B is taken to be a fourth line. Furthermore, in the following description, reference characters (A) and (B) will be applied to a signal computed in the direction of arrow A and a signal computed in the direction of arrow B, respectively.

First, an R-signal at a Bj-pixel position becomes a value computed by the following Eq. (13) or (14), as with the above-mentioned Eq. (12).

$$Rj(A)=Gj(A)+((Rm(A)-Gm)+(Rg(A)-Gg))/2 \quad (13)$$

$$Rj(B)=Gj(B)+((Rf(B)-Gf)+(Rn(B)-Gn))/2 \quad (14)$$

where the signal value Gj (A) is a G-signal at a Bj-pixel position computed by performing a one-dimensional interpolation computation on G-signals present on a line in the direction of arrow A (second line) to which the Bj-pixel position belongs, the signal value Gj(B) is a G-signal at the Bj-pixel position computed by performing a one-dimensional interpolation computation on G-signals present on a line in the direction of arrow B (fourth line) to which the Bj-pixel position belongs, the signal value Rm(A) is an R-signal at a Bm-pixel position computed by performing a one-dimensional interpolation computation on R-signals present on a line in the direction of arrow A (first line) to which the Bm-pixel position belongs, the signal value Rg(A) is an R-signal at a Gg-pixel position computed by performing a one-dimensional interpolation computation on R-signals present on a line in the direction of arrow A (second line) to which the Gg-pixel position belongs, the signal value Rf(B) is an R-signal at a Gf-pixel position computed by performing a one-dimensional interpolation computation on R-signals present on a line in the direction of arrow B (third line) to which the Gf-pixel position belongs, and the signal value Rn(B) is an R-signal at a Gn-pixel position computed by performing a one-dimensional interpolation computation on R-signals present on a line in the direction of arrow B to which the Gn-pixel position belongs.

In the second embodiment, the signal values Rj(A) and Rj(B) computed from Eqs. (13) and (14) by the first and second RB-interpolation means 12 and 13 are weighted and added by the weighting-addition means 14 to compute an R-signal. The fluctuation-direction scale computation means 15 computes this weighting coefficient as a fluctuation-direction scale Si.

The fluctuation-direction scale Sj can be computed by the following Eqs. (15), (16), and (17):

$$Sjv=|Bj-Gj(A)|/(Bj+Gj(A)) \quad (15)$$

$$Sjh=|Bj-Gj(B)|/(Bj+Gj(B)) \quad (16)$$

$$Sj=Sjv/(Sjv+Sjh)(\text{if } Sjv+Sjh=0 \text{ then } Sj=0.5) \quad (17)$$

in which Sjv represents a change in a signal value at a Bj-pixel position in the direction of arrow A and Sjh represents a change in a signal value at a Bj-pixel position in the direction of arrow B. Also, the range of Sj is $0 \leq Sj \leq 1$, and if a fluctuation in a signal value is less in the direction of arrow A, the signal value becomes a value nearer to 0.

In the weighting-addition means 14, an R-signal is computed by the following Eq. (18), using the fluctuation-direction scale Sj.

$$Rj=(1-Sj)*Rj(A)+Sj*Rj(B) \quad (18)$$

With this equation, greater weighting is performed in a direction where a change in a pixel value is less. In this manner an R-signal at a Bj-pixel position is to be computed.

Note that an R-signal at a Gf-pixel position becomes a value computed by the following Eq. (19) or (20), as with the above-mentioned Eq. (7).

$$Rf(A)=Gf+((Ri-Gi(A))+(Rc-Gc(A))/2 \quad (19)$$

$$Rf(B)=Rf \quad (20)$$

in which the signal value Gi(A) is a G-signal at an Ri-pixel position computed by performing a one-dimensional interpolation computation on G-signals present on a line in the direction of arrow A (first line) to which the Ri-pixel position belongs, the signal value Gc(A) is a G-signal at an Rc-pixel position computed by performing a one-dimensional interpolation computation on G-signals present on a line in the direction of arrow A to which the Rc-pixel position belongs, and Rf is an R-signal at a Gf-pixel position computed by performing a one-dimensional interpolation computation on R-signals present on a line in the direction of arrow B to which the Gf-pixel position belongs.

In this case the fluctuation-direction scale Sf can be computed by the following Eqs. (21), (22), and (23):

$$Sfv=|Bf(A)-Gf|/(Bf(A)+Gf) \quad (21)$$

where the signal Bf(A) is a B-signal at a Gf-pixel position obtained by performing a one-dimensional interpolation computation on B-signals present on a line in the direction of arrow A (second line) to which the Gf-pixel position belongs, $$Sfh=|Rf(B)-Gf|/(Rf(B)+Gf) \quad (22)$$

where the signal Rf(B) is an R-signal at a Gf-pixel position obtained by performing a one-dimensional interpolation computation on R-signals present on a line in the direction of arrow B to which the Gf-pixel position belongs, $$Sf=Sfv/(Sfv+Sfh)(\text{if } Sfv+Sfh=0 \text{ then } Sf=0.5) \quad (23)$$

where the range of Sj is $0 \leq Sj \leq 1$, and if a fluctuation in a signal value is less in the direction of arrow A, the signal value becomes a value nearer to 0.

In the weighting-addition means 14, an R-signal is computed by the following Eq. (24), using a fluctuation-direction scale Sf.

$$Rf=(1-Sf)*Rf(A)+Sf*Rf(B) \quad (24)$$

With this equation, greater weighting is performed in a direction where a change in a pixel value is less. In this way an R-signal at a Gf-pixel position is to be computed.

On the other hand, for a B-signal, a fluctuation-direction scale is calculated in the same manner as an R-signal. With this, a B-signal is also computed by weighting and adding B-signals computed in the directions of arrows A and B.

The R-signals and the B-signals obtained by weighting and addition, along with G-signals, are given an interpolation computation by the checkers-square interpolation means 16, and signal values at vacant pixel positions (*) are computed. In this manner, interpolated image data S1 is output.

Thus, in accordance with the second embodiment, the occurrence of a false color can be prevented in spite of a change in a signal value and the occurrence of an artifact also prevented, because an R-signal and a B-signal at each pixel position are computed, by weighting and adding signal values computed in the directions of arrows A and B according to a direction in which a signal value changes.

While, in the single plate CCD 1 of each of the above-mentioned embodiments, G-pixels has a density twice R-pixels and B-pixels, R-pixels may have a density twice G-pixels and B-pixels, or B-pixels may have a density twice R-pixels and G-pixels. In addition,while the single plate CCD 1 has respective spectral sensitivities with respect to R, G, and B, it is not limited to R, G, and B. It may have respective spectral sensitivities with respect to yellow (Y), green (G), and cyan (C), or with respect to Y, white (W), and C. Furthermore, although, in the above-mentioned embodiments, the signals values of all the 3 colors have been computed, the signal values of only 1 or 2 colors may be computed.

Figure 14:
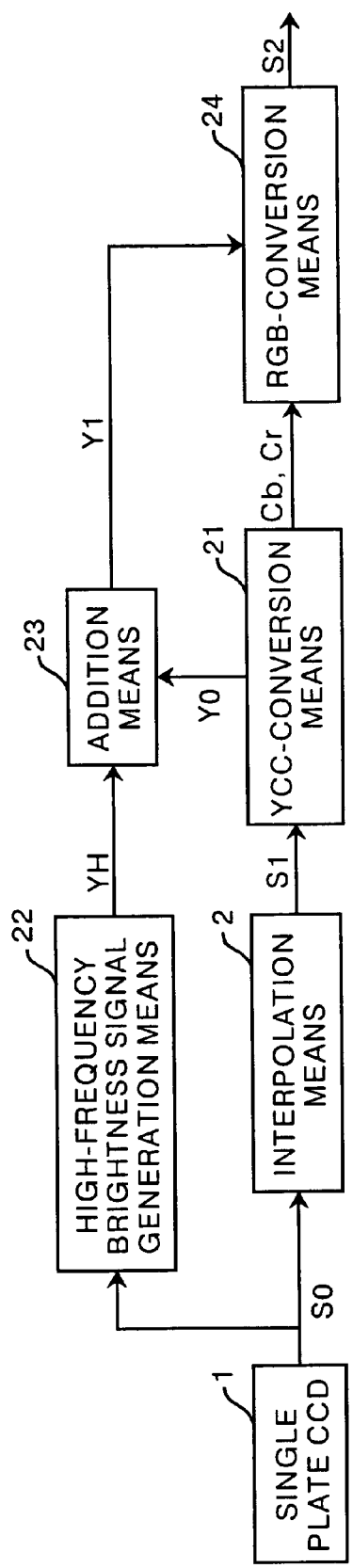
FIG. 14 is a block diagram showing an image processor constructed according to a third embodiment of the present invention.

FIG. 14 illustrates an image processor constructed according to a third embodiment of the present invention. As shown in the figure, the image processor according to the third embodiment processes image data S0 obtained by a single plate CCD 1 and comprises (1) the same interpolation means 2 as the first embodiment for obtaining interpolated image data S1 which consists of color signals R1, G1, and B1 by performing an interpolating process on the image data S0; (2) YCC-conversion means 21 for obtaining an estimated brightness signal Y0 and estimated color difference signals Cb and Cr which represent the brightness information and color difference information of the interpolated image data S1 by performing YCC conversion on the interpolated image data S1; (3) high-frequency brightness signal generation means 22 for generating a high-frequency brightness signal YH which represents the brightness information of the high frequency of the image data S0; (4) addition means 23 for obtaining an added brightness signal Y1 by adding the high-frequency brightness signal YH and the estimated brightness signal Y0; and (5) RGB-conversion means 24 for obtaining processed image data S2 which consists of color signals R2, G2, and B2 by performing RGB conversion on the added brightness signal Y1 and the color difference signals Cb and Cr.

The YCC-conversion means 21 converts the interpolated image data S1 into the added brightness signal Y1 and the color difference signals Cb and Cr, as shown in the following Eqs. (25) through (27):

$$Y0=0.299R1+0.587G1+0.114B1 \quad (25)$$

$$Cb=(B1-Y0)/1.772 \quad (26)$$

$$Cr=(R1-Y0)/1.402 \quad (27)$$

in which R1, G1, and B1 are color signals which constitute the interpolated image data S1.

The high-frequency brightness signal generation means 22 generates a high-frequency brightness signal YH which represents the brightness information of the high frequency of the image data S0, by employing each signal value (R, G, and B) at each pixel position (which constitutes the image data S0), as it is, as a brightness signal, and by performing a filtering process, which employs a high-pass filter for cutting frequency components equivalent to the estimated brightness signal Y, on this brightness signal. The method for obtaining the high-frequency brightness signal YH may adopt, for example, a method of obtaining a brightness signal by the above-mentioned Eq. (25) after a filtering process has been performed on each signal value (R, G, and B) by a high-pass filter (Japanese Unexamined Patent Publication No. 5(1993)-228108), a method of obtaining a brightness signal of each signal value (R, B, and B) by the above-mentioned Eq. (25) and then performing a filtering process on this brightness signal by a high-pass filter (the same Publication No. 6(1994)-30444), a method of extracting a high-frequency brightness signal from image data by an inter-field YC separating process (the same Publication No. 6(1994)-225343), and a method of obtaining a brightness signal of each signal value (R, G, and B) by the above-mentioned Eq. (25), then performing a gamma correction process on this brightness signal, and performing a filtering process on the corrected signal by a high-pass filter (the same publication No. 8(1996)-9199).

The RGB-conversion means 24 inversely solves the above-mentioned Eqs. (25) through (27) with respect to the added brightness signal Y1 and the color difference signals Cb and cr thereby obtaining the color signals R2, G2, and B2 which constitute the processed image data S2.

Assuming the ratio of the color signals R, G, and B constituting the image data S0 does not change sharply at positions on an image represented by image data S0, the high-frequency brightness signal YH (obtained by employing each signal value (R. G, and B) at each pixel position (which constitutes the image data S0), as it is, as a brightness signal, and also by performing a filtering process, which employs a high-pass filter for cutting frequency components equivalent to the estimated brightness signal Y, on this brightness signal) represents with fidelity the high-frequency component of an image represented by image data S0. Thus, when an image represented by the image data S0 is achromatic, or when a change in the ratio of the values of an R-signal, a G-signal, and a B-signal is small, the resolution of a processed image which is represented by the processed image data S2 can be enhanced by obtaining the processed image data S2 by the use of the added brightness signal Y1.

However, when an image represented by the image data S0 is chromatic and when a change in the ratio of the values of an R-signal, a G-signal, and a B-signal is great, a false signal will occur in the high-frequency brightness signal YH and gray noise will appear in a processed image. Therefore, in such a case, if a high-frequency brightness signal is generated according to the balance between the resolution of a processed image and a false signal by employing a band-pass filter for cutting a frequency component of a frequency band corresponding to this gray noise component, gray noise can be reduced and image resolution can also be enhanced.

Figure 15:
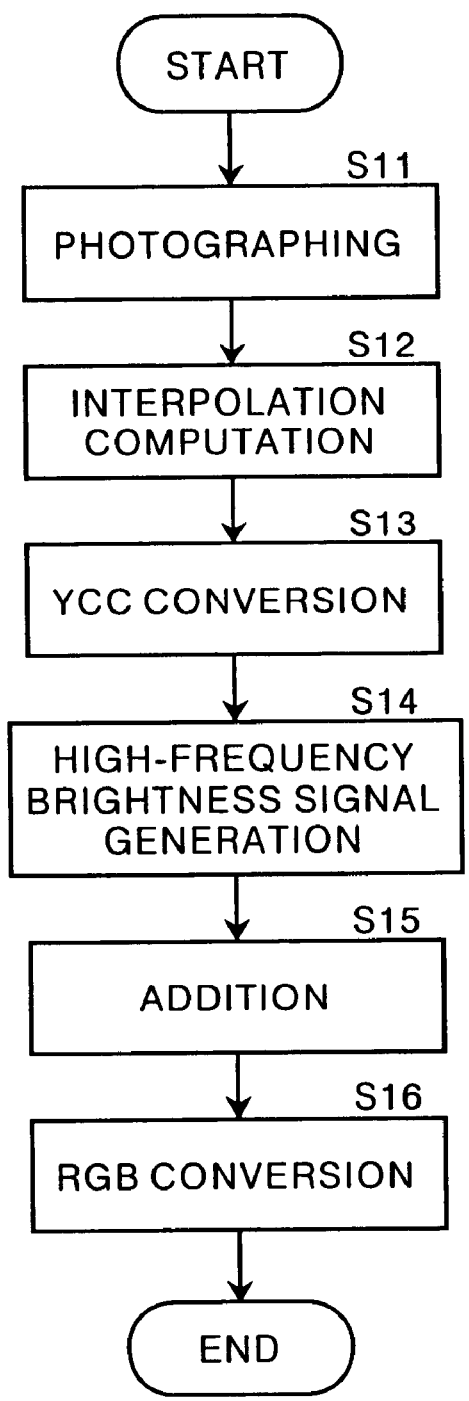
FIG. 15 is a flowchart showing the operation of the third embodiment.

Next, the operation of the third embodiment will be described with reference to FIG. 15. First, a subject is photographed and image data S0 is obtained by the single plate CCD 1 (step S11). Then, the interpolation means 2, as with the first and second embodiments, performs an interpolation computation, thereby obtaining interpolated image data S1 (step S12). Next, the YCC-conversion means 21 performs YCC conversion on the interpolated image data S1, thereby obtaining an estimated brightness signal Y0 and estimated color difference signals Cb, Cr (step S13). On the other hand, the high-frequency brightness signal generation means 22 generates the high-frequency brightness signal YH of the image data S0 (step S14). Note that step S14 may be performed prior to steps S12 and S13, or they may be performed in parallel.

Next, the addition means 23 adds the high-frequency brightness signal YH and the estimated brightness signal Y0, thereby obtaining an added brightness signal Y1 (step S15). The added brightness signal Y1, along with the estimated color difference signals Cb and Cr, is converted to RGB-signals, whereby processed image data S2 is obtained (step S16). In this manner the process ends.

Here, the added brightness signal Y1, obtained by adding the high-frequency brightness signal YH (which represents with fidelity the high frequency component of an image represented by the image data S0) and the estimated brightness signal Y0 (obtained from the interpolated image data S1 in which the occurrence of a false color has been reduced), represents the high frequency component of a scene with fidelity and becomes a signal in which the occurrence of a false signal has also been reduced for the low frequency component. Therefore, a processed image with no false color and with high resolution can be obtained by obtaining the processed image data S2, based on the added brightness signal Y1 and the estimated color difference signals Cb and Cr, as in the third embodiment.

Note that although the aforementioned embodiments have processed the image data S0 obtained by the single plate CCD 1, the present invention can likewise process image data obtained in any manner, if it is image data which represents an image having an array of pixels such as the one shown in FIG. 2A or 2B.

While the present invention has been described with reference to the preferred embodiments thereof, the invention is not to be limited to the details given herein, but may be modified within the scope of the appended claims.

In addition, all of the contents of Japanese Patent Application Nos. 11(1999)-212202 and 2000-155621 are incorporated into this specification by reference.

What is claimed is:

1. A method of processing image data,
    said data representing an image that includes a first pixel, a second pixel, and a third pixel that have a first signal value, a second signal value, and a third signal value that have different spectral distributions,
    said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
    said method comprising a step of estimating at least one signal value among said first signal value, said second signal value, and said third signal value at all pixel positions, based on said first signal value, said second signal value, and said third signal value,
    wherein said second signal value on said second line is estimated based on a difference between said first signal value and said second signal value on said first line adjacent to said second line,
    wherein a second signal value at said first pixel on said second line is estimated based on a difference between a second signal value at said second pixel adjacent to said first pixel on said first line, and said first signal value at said second pixel computed by performing a one-dimensional interpolation computation on said first signal value on said first line, and
    wherein a second signal value at said first pixel on said second line is estimated by adding said difference to a first signal value at said first pixel on said second line.

2. The method as set forth in claim 1, wherein a second signal value at said third pixel on said second line is estimated based on a difference between a first signal value at said first pixel adjacent to said third pixel on said first line, and said second signal value at said first pixel computed by performing a one-dimensional interpolation computation on said second signal value on said first line.

3. The method as set forth in claim 1, wherein said difference is an average value of said differences on said two first lines adjacent to said second line.

4. The method as set forth in claim 1, wherein said third signal value on said first line is estimated based on a difference between said first signal value and said third signal value on said second line adjacent to said first line.

5. The method as set forth in claim 1, wherein
    when, in a direction orthogonal to said predetermined direction, said first and second pixels are alternately arrayed and said first and third pixels are alternately arrayed so that said first line and said second line are formed in said orthogonal direction,
    a predetermined-direction estimated value based on said first and second lines in said predetermined direction is computed and an orthogonal-direction estimated value based on said first and second lines in said orthogonal direction is computed; and
    at least one signal value among said first signal value, said second signal value, and said third signal value is estimated, by weighting and adding said predetermined-direction estimated value and said orthogonal-direction estimated value by a predetermined weighting coefficient in accordance with a pixel position for estimating a signal value.

6. The method as set forth in claim 5, wherein said predetermined weighting coefficient is computed based on a scale value which represents a direction of a change in a signal value at said pixel position for estimating a signal value.

7. The method as set forth in claim 1, wherein said first signal value, said second signal value, and said third signal value are any color signal of green, blue, and red, respectively.

8. The method as set forth in claim 1, wherein said first signal value, said second signal value, and said third signal value are any color signal of yellow, green, and cyan, respectively.

9. The method as set forth in claim 1, wherein said image data is obtained by an imaging device having an imaging surface,
    said imaging surface being formed by arraying a first photoelectric conversion element, a second photoelectric conversion element, and a third photoelectric conversion element having different spectral sensitivities, on a single surface,
    said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

10. A method of processing image data, said data representing an image that includes a first pixel, a second pixel, and a third pixel that have a first signal value a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said method comprising the steps of:
obtaining estimated data by estimating at least one signal value among said first signal value, said second signal value, and said third signal value at all pixel positions on said image, by the method as set forth in claim 1;
generating a high-frequency brightness signal which represents brightness information of a high frequency of said image data;
converting said estimated image data to an estimated brightness signal and an estimated color difference signal which represent brightness information and color difference information of said estimated image data;
obtaining an added brightness signal by adding said estimated brightness signal and said high-frequency brightness signal; and
employing said added brightness signal and said estimated color difference signal as a brightness color difference signal of said image data.

11. The method as set forth in claim 10, wherein said high-frequency brightness signal is generated by performing a filtering process on said image data through a high-pass filter for cutting a frequency component of a frequency band of said estimated brightness signal.

12. The method as set forth in claim 10, wherein said high-frequency brightness signal is generated by performing a filtering process on said image data through a band-pass filter having a predetermined passband characteristic.

13. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having:
a procedure of obtaining estimated image data by estimating at least one signal value among said first signal value, said second signal value, and said third signal value at all pixel positions on said image, by the method as set forth in claim 1,
a procedure of generating a high-frequency brightness signal which represents brightness information of a high frequency of said image data;
a procedure of converting said estimated image data to an estimated brightness signal and an estimated color difference signal which represent brightness information and color difference information of said estimated image data; and
a procedure of obtaining an added brightness signal by adding said estimated brightness signal and said high-frequency brightness signal;
wherein said added brightness signal and said estimated color difference signal are employed as a brightness color difference signal of said image data.

14. The storage medium as set forth in claim 13, wherein said procedure of generating said high-frequency brightness signal is a procedure of generating said high-frequency brightness signal by performing a filtering process on said image data through a high-pass filter for cutting a frequency component of a frequency band of said estimated brightness signal.

15. The storage medium as set forth in claim 13, wherein said procedure of generating said high-frequency brightness signal is a procedure of generating said high-frequency brightness signal by performing a filtering process on said image data through a band-pass filter having a predetermined passband characteristic.

16. A method of processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said method comprising a step of estimating at least one signal value among said first signal value, said second signal value, and said third signal value at all pixel positions, based on said first signal value, said second signal value, and said third signal value, wherein said second signal value on said second line is estimated based on a difference between said first signal value and second signal value on said first line adjacent to said second line, and wherein a second signal value at said third pixel on said second line is estimated based on a difference between a first signal value at said first pixel adjacent to said third pixel on said first line, and said second signal value at said first pixel computed by performing a one-dimensional interpolation computation on said second signal value on said first line.

17. The method as set forth in claim 16, wherein a first signal value at said third pixel on said second line is computed by performing a one-dimensional interpolation computation on said first signal value on said second line; and a second signal value at said third pixel on said second line is estimated by adding said difference to said computed first signal value.

18. The method as set forth in claim 17, wherein said difference is an average value of said differences on said two first lines adjacent to said second line.

19. The method as set forth in claim 17, wherein said third signal value on said first line is estimated based on a difference between said first signal value and said third signal value on said second line adjacent to said first line.

20. The method as set forth in claim 16, wherein said difference is an average value of said differences on said two first lines adjacent to said second line.

21. The method as set forth in claim 16, wherein said third signal value on said first line is estimated based on a difference between said first signal value and said third signal value on said second line adjacent to said first line.

22. The method as set forth in claim 16, wherein
when, in a direction orthogonal to said predetermined direction, said first and second pixels are alternately arrayed and said first and third pixels are alternately arrayed so that said first line and said second line are formed in said orthogonal direction,
a predetermined-direction estimated value based on said first and second lines in said predetermined direction is computed and an orthogonal-direction estimated value based on said first and second lines in said orthogonal direction is computed; and
at least one signal value among said first signal value, said second signal value, and said third signal value is estimated, by weighting and adding said predetermined-direction estimated value and said orthogonal-direction estimated value by a predetermined weighting coefficient in accordance with a pixel position for estimating a signal value.

23. The method as set forth in claim 22, wherein said predetermined weighing coefficient is computed based on a scale value which represents a direction of a change in a signal value at said pixel position for estimating a signal value.

24. The method as set forth in claim 22, wherein said predetermined weighing coefficient is computed based on a scale value which represents a direction of a change in a signal value at said pixel position for estimating a signal value.

25. The method as set forth in claim 16, wherein said first signal value, said second signal value, and said third signal value are any color signal of green, blue, and red, respectively.

26. The method as set forth in claim 16, wherein said first signal value, said second signal value, and said third signal value are any color signal of yellow, green, and cyan, respectively.

27. The method as set forth in claim 16, wherein said image data is obtained by an imaging device having an imaging surface,
said imaging surface being formed by arraying a first photoelectric conversion element, a second photoelectric conversion element, and a third photoelectric conversion element having different spectral sensitivities, on a single surface,
said first and second photoelectric conversion elements being alternately arrayed in a predetermined direction to form a first line,
said first and third photoelectric conversion elements being alternately arrayed in said predetermined direction to form a second line, and
said first line and said second line being alternately arrayed a direction approximately orthogonal to said predetermined direction.

28. A method of processing image data,
said data representing an image that includes a first pixel, a second pixel, and a third pixel that have a first signal value a second signal value, and a third signal value that have different spectral distributions,
said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
said method comprising the steps of:
obtaining estimated data by estimating at least one signal value among said first signal value, said second signal value, and said third signal value at all pixel positions on said image, by the method as set forth in claim 16,
generating a high-frequency brightness signal which represents brightness information of a high frequency of said image data;
converting said estimated image data to an estimated brightness signal and an estimated color difference signal which represent brightness information and color difference information of said estimated image data;
obtaining an added brightness signal by adding said estimated brightness signal and said high-frequency brightness signal; and
employing said added brightness signal and said estimated color difference signal as a brightness color difference signal of said image data.

29. The method as set forth in claim 28, wherein said high-frequency brightness signal is generated by performing a filtering process on said image data through a high-pass filter for cutting a frequency component of a frequency band of said estimated brightness signal.

30. The method as set forth in claim 28, wherein said high-frequency brightness signal is generated by performing a filtering process on said image data through a band-pass filter having a predetermined passband characteristic.

31. A computer readable storage medium in which a program for causing a computer to execute a method of processing image data is stored,
said data representing an image that includes a first pixel, a second pixel, and a third pixel that have a first signal value, a second signal value, and a third signal value that have different spectral distributions,
said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
said image processing method being used for estimating at least one signal value among said first signal value, said second signal value, and said third signal value at all pixel positions, based on said first signal value, said second signal value, and said third signal value,
said program having:
a procedure of obtaining estimated image data by estimating at least one signal value among said first signal value, said second signal value, and said third signal value at all pixel positions on said image, by the method as set forth in claim 16;

a procedure of generating a high-frequency brightness signal which represents brightness information of a high frequency of said image data;

a procedure of converting said estimated image data to an estimated brightness signal and an estimated color difference signal which represent brightness information and color difference information of said estimated image data; and a procedure of obtaining an added brightness signal by adding said estimated brightness signal and said high-frequency brightness signal;

wherein said added brightness signal and said estimated color difference signal are employed as a brightness color difference signal of said image data.

32. The storage medium as set forth in claim 31, wherein said procedure of generating said high-frequency brightness signal is a procedure of generating said high-frequency brightness signal by performing a filtering process on said image data through a high-pass filter for cutting a frequency component of a frequency band of said estimated brightness signal.

33. The storage medium as set forth in claim 31, wherein said procedure of generating said high-frequency brightness signal is a procedure of generating said high-frequency brightness signal by performing a filtering process on said image data through a band-pass filter having a predetermined passband characteristic.

34. A method of processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said method comprising a step of estimating at least one signal value among said first signal value, said second signal value, and said third signal value at all pixel positions, based on said first signal value, said second signal value, and said third signal value, wherein said second signal value on said second line is estimated based on a difference between said first signal value and said second signal value on said first line adjacent to said second line, wherein a second signal value at said first pixel on said second line is estimated based on a difference between a second signal value at said second pixel adjacent to said first pixel on said first line, and said first signal value at said second pixel computed by performing a one-dimensional interpolation computation on said first signal value on said first line, and wherein a second signal value at said third pixel on said second line is estimated based on a difference between a first signal value at said first pixel adjacent to said third pixel on said first line, and said second signal value at said first pixel computed by performing a one-dimensional interpolation computation on said second signal value on said first line.

35. The method as set forth in claim 34, wherein said difference is an average value of said differences on said two first lines adjacent to said second line.

36. The method as set forth in claim 35, wherein said third signal value on said first line is estimated based on a difference between said first signal value and said third signal value on said second line adjacent to said first line.

37. The method as set forth in claim 34, wherein when, in a direction orthogonal to said predetermined direction, said first and second pixels are alternately arrayed and said first and third pixels are alternately arrayed so that said first line and said second line are formed in said orthogonal direction, a predetermined-direction estimated value based on said first and second lines in said predetermined direction is computed and an orthogonal-direction estimated value based on said first and second lines in said orthogonal direction is computed; and at least one signal value among said first signal value, said second signal value, and said third signal value is estimated, by weighting and adding said predetermined-direction estimated value and said orthogonal-direction estimated value by a predetermined weighting coefficient in accordance with a pixel position for estimating a signal value.

38. The method as set forth in claim 34, wherein said first signal value, said second signal value, and said third signal value are any color signal of green, blue, and red, respectively.

39. The method as set forth in claim 34, wherein said first signal value, said second signal value, and said third signal value are any color signal of yellow, green, and cyan, respectively.

40. The method as set forth in claim 34, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed a direction approximately orthogonal to said predetermined direction.

41. A method of processing image data, said data representing an image that includes a first pixel, a second pixel, and a third pixel that have a first signal value a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said method comprising the steps of:

obtaining estimated data by estimating at least one signal value among said first signal value, said second signal value, and said third signal value at all pixel positions on said image, by the method as set forth claim 34;

generating a high-frequency brightness signal which represents brightness information of a high frequency of said image data;

converting said estimated image data to an estimated brightness signal and an estimated color difference signal which represent brightness information and color difference information of said estimated image data;

obtaining an added brightness signal by adding said estimated brightness signal and said high-frequency brightness signal; and employing said added brightness signal and said estimated color difference signal as a brightness color difference signal of said image data.

42. The method as set forth in claim 41, wherein said high-frequency brightness signal is generated by performing a filtering process on said image data through a high-pass filter for cutting a frequency component of a frequency band of said estimated brightness signal.

43. The method as set forth in claim 41, wherein said high-frequency brightness signal is generated by performing a filtering process on said image data through a band-pass filter having a predetermined passband characteristic.

44. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having:

a procedure of obtaining estimated image data by estimating at least one signal value among said first signal value, said second signal value, and said third signal value at all pixel positions on said image, by the method as set forth in claim 34;

a procedure of generating a high-frequency brightness signal which represents brightness information of a high frequency of said image data;

a procedure of converting said estimated image data to an estimated brightness signal and an estimated color difference signal which represent brightness information and color difference information of said estimated image data; and a procedure of obtaining an added brightness signal by adding said estimated brightness signal and said high-frequency brightness signal;

wherein said added brightness signal and said estimated color difference signal are employed as a brightness color difference signal of said image data.

45. The storage medium as set forth in claim 44, wherein said procedure of generating said high-frequency brightness signal is a procedure of generating said high-frequency brightness signal by performing a filtering process on said image data through a high-pass filter for cutting a frequency component of a frequency band of said estimated brightness signal.

46. The storage medium as set forth in claim 44, wherein said procedure of generating said high-frequency brightness signal is a procedure of generating said high-frequency brightness signal by performing a filtering process on said image data through a band-pass filter having a predetermined passband characteristic.

47. A method of processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said method comprising a step of estimating at least one signal value among said first signal value, said second signal value, and said third signal value at all pixel positions, based on said first signal value, said second signal value, and said third signal value, wherein said second signal value on said second line is estimated based on a difference between said first signal value and said second signal value on said first line adjacent to said second line, and wherein said third signal value on said first line is estimated based on a difference between said first signal value and said third signal value on said second line adjacent to said first line.

48. The method as set forth in claim 47, wherein a third signal value at said first pixel on said first line is estimated based on a difference between a third signal value at said third pixel adjacent to said first pixel on said second line, and said first signal value at said third pixel computed by performing a one-dimensional interpolation computation on said first signal value on said second line.

49. The methods set forth in claim 48, wherein a third signal value at said first pixel on said first line is estimated by adding said difference to a first signal value at said first pixel on said first line.

50. The methods set forth in claim 49, wherein a third signal value at said second pixel on said first line is estimated based on a difference between a first signal value at said first pixel adjacent to said second pixel on said second line, and said third signal value at said first pixel computed by performing a one-dimensional interpolation computation on said third signal value on said second line.

51. The method as set forth in claim 49, wherein said difference is an average value of said differences on said two second lines adjacent to said first line.

52. The methods set forth in claim 48, wherein a third signal value at said second pixel on said first line is estimated based on a difference between a first signal value at said first pixel adjacent to said second pixel on said second line, and said third signal value at said first pixel computed by performing a one-dimensional interpolation computation on said third signal value on said second line.

53. The method as set forth in claim 48, wherein said difference is an average value of said differences on said two second lines adjacent to said first line.

54. The methods set forth in claim 47, wherein a third signal value at said second pixel on said first line is estimated based on a difference between a first signal value at said first pixel adjacent to said second pixel on said second line, and said third signal value at said first pixel computed by performing a one-dimensional interpolation computation on said third signal value on said second line.

55. The method as set forth in claim 54, wherein
   a first signal value at said second pixel on said first line is computed by performing a one-dimensional interpolation computation on said first signal value on said first line; and
   a third signal value at said second pixel on said first line is estimated by adding said difference to said computed first signal value.

56. The method as set forth in claim 55, wherein said difference is an average value of said differences on said two second lines adjacent to said first line.

57. The method as set forth in claim 54, wherein said difference is an average value of said differences on said two second lines adjacent to said first line.

58. A method of processing image data,
   said data representing an image that includes a first pixel, a second pixel, and a third pixel that have a first signal value, a second signal value, and a third signal value that have different spectral distributions,
   said first pixel and said second pixel being alternately arrayed in a predetermined direction to form a first line, said first pixel and said third pixel being alternately arrived in said predetermined direction to form a second line, and said first line and said second line being alternately arrayed in a direction approximately orthogonal to said predetermined direction,
   said method comprising a step of estimating at least one signal value among said first signal value, said second signal value, and said third signal value at all pixel positions, based on said first signal value, said second signal value, and said third signal value,
   wherein said second signal value on said second line is estimated based on a difference between said first signal value and said second signal value on said first line adjacent to said second line,
   wherein a second signal value at said first pixel on said second line is estimated based on a difference between a second signal value at said second pixel adjacent to said first pixel on said first line, and said first signal value at said second pixel computed by performing a one-dimensional interpolation computation on said first signal value on said first line, and
   wherein said third signal value on said first line is estimated based on a difference between said first signal value and said third signal value on said second line adjacent to said first line.

59. A method of processing image data,
   said data representing an image that includes a first pixel, a second pixel, and a third pixel that have a first signal value, a second signal value, and a third signal value that have different spectral distributions,
   said first pixel and said second pixel being alternately arrayed in a predetermined direction to form a first line, said first pixel and said third pixel being alternately arrayed in said predetermined direction to form a second line, and said first line and said second line being alternately arrived in a direction approximately orthogonal to said predetermined direction,
   said method comprising a step of estimating at least one signal value among said first signal value, said second signal value, and said third signal value at all pixel positions, based on said first signal value, said second signal value, and said third signal value,
   wherein said second signal value on said second line is estimated based on a difference between said first signal value and said second signal value on said first line adjacent to said second line, and
   when, in a direction orthogonal to said predetermined direction, said first and second pixels are alternately arrayed and said first and third pixels are alternately arrayed so that said first line and said second line are formed in said orthogonal direction,
   at least one signal value among said first signal value, said second signal value and said third signal value is estimated by switching said first and second lines in said predetermined direction and said first and second lines in said orthogonal direction in accordance with a pixel position for estimating a signal value.

60. The method as set forth in claim 59, wherein said switching is performed based on a scale value which represents a direction of a change in a signal value at said pixel position for estimating a signal value.

61. A method of processing image data,
   said data representing an image that includes a first pixel, a second pixel, and a third pixel that have a first signal value, a second signal value, and a third signal value that have different spectral distributions,
   said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
   said method comprising a step of estimating at least one signal value among said first signal value, said second signal value, and said third signal value at all pixel positions, based on said first signal value, said second signal value, and said third signal value,
   wherein said second signal value on said second line is estimated based on a difference between said first signal value and said second signal value on said first line adjacent to said second line, and
   wherein an array of pixels on said first line relatively shifts out of position by approximately one-half a pixel in said predetermined direction with respect to an array of pixels on said second line so that said first, second, and third pixels are arrayed checkerwise.

62. The methods set forth in claim 61, wherein signal values at all pixel positions are estimated and signal values at vacancy pixel positions are estimated based on said estimated signal values.

63. An image processor for processing image data,
   said data representing an image that includes a first pixel, a second pixel, and a third pixel that have a first signal value, a second signal value, and a third signal value that have different spectral distributions,
   said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
   said image processor comprising estimation means for estimating at least one signal value among said first signal value, said second signal value, and said third signal value at all pixel positions, based on said first signal value, said second signal value, and said third signal value, wherein said estimation means estimates said second signal value on said second line, based on a difference between said first signal value and said second signal value on said first line adjacent to said second line, and wherein said estimation means estimates a second signal value at said third pixel on said second line, based on a difference between a first signal value at said first pixel adjacent to said third pixel on said first line, and said second signal value at said first pixel computed by performing a one-dimensional interpolation computation on said second signal value on said first line.

64. The image processor as set forth in claim 63, wherein said estimation means estimates said third signal value on said first line, based on a difference between said first signal value and said third signal value on said second line adjacent to said first line.

65. The image processor as set forth in claim 63, wherein
when, in a direction orthogonal to said predetermined direction, said-first and second pixels are alternately arrayed and said first and third pixels are alternately arrayed so that said first line and said second line are formed in said orthogonal direction, said estimation means estimates at least one signal value among said first signal value, said second signal value, and said third signal value, by switching said first and second lines in said predetermined direction and said first and second lines in said orthogonal direction in accordance with a pixel position for estimating a signal value.

66. The image processor as set forth in claim 63, wherein
when, in a direction orthogonal to said predetermined direction, said first and second pixels are alternately arrayed and said first and third pixels are alternately arrayed so that said first line and said second line are formed in said orthogonal direction, said estimation means comprises
means for computing a predetermined-direction estimated value based on said first and second lines in said predetermined direction and an orthogonal-direction estimated value based on said first and second lines in said orthogonal direction, and means for estimating at least one signal value among said first signal value, said second signal value, and said third signal value, by weighting and adding said predetermined direction estimated value and said orthogonal-direction estimated value by a predetermined weighting coefficient in accordance with a pixel position for estimating a signal value.

67. The image processor as set forth in claim 66, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

68. The image processor as set forth in claim 63, wherein an array of pixels on said first line relatively shifts out of position by approximately one-half a pixel in said predetermined direction with respect to an array of pixels on said second line so that said first, second, and third pixels are arrayed checkerwise.

69. The image processor as set forth in claim 63, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

70. An image processor for processing image data,
said data representing an image that includes a first pixel, a second pixel, and a third pixel that have a first signal value, a second signal value, and a third signal value, that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising:
interpolation means for obtaining estimated image data by estimating at least one signal value among said first signal value, said second signal value, and said third signal value at all pixel positions on said image, by the image processor as set forth in claim 63;

high-frequency brightness signal generation means for generating a high-frequency brightness signal which represents brightness information of a high frequency of said image data;

brightness color-difference conversion means for converting said estimated image data to an estimated brightness signal and an estimated color difference signal which represent brightness information and color difference information of said estimated image data; and addition means for obtaining an added brightness signal by adding said estimated brightness signal and said high-frequency brightness signal;

wherein said added brightness signal and said estimated color difference signal are employed as a brightness color-difference signal of said image data.

71. The image processor as set forth in claim 70, wherein said high-frequency brightness signal generation means generates said high-frequency brightness signal by performing a filtering process on said image data through a high-pass filter for cutting a frequency component of a frequency band of said estimated brightness signal.

72. The image processor as set forth in claim 70, wherein said high-frequency brightness signal generation means generates said high-frequency brightness signal by performing a filtering process on said image data through a band-pass filter having a predetermined passband characteristic.

73. An imaging device comprising the image processor as set forth in claim 63.

74. An output device comprising the image processor as set forth in claim 63.

75. An image processor for processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising estimation means for estimating at least one signal value among said first signal value, said second signal value, and said third signal value at all pixel positions, based on said first signal value, said second signal value, and said third signal value, wherein said estimation means estimates said second signal value on said second line, based on a difference between said first signal value and said second signal value on said first line adjacent to said second line, wherein said estimation means estimates a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein said estimation means estimates a second signal value at said third pixel on said second line, based on a difference between a first signal value at said first pixel adjacent to said third pixel on said first line, and said second signal value at said first pixel computed by performing a one-dimensional interpolation computation on said second signal value on said first line.

76. The image processor as set forth in claim 75, wherein when, in a direction orthogonal to said predetermined direction, said first and second pixels are alternately arrayed and said first and third pixels are alternately arrayed so that said first line and said second line are formed in said orthogonal direction, said estimation means comprises means for computing a predetermined-direction estimated value based on said first and second lines in said predetermined direction and an orthogonal-direction estimated value based on said first and second lines in said orthogonal direction, and means for estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

77. The image processor as set forth in claim 76, wherein an array of pixels on said first line relatively shifts out of position by approximately one-half a pixel in said predetermined direction with respect to an array of pixels on said second line so that said first, second, and third pixels are arrayed checkerwise.

78. The image processor as set forth in claim 76, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

79. The image processor as set forth in claim 75, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

80. An image processor for processing image data, said data representing an image that includes a first pixel, a second pixel, and a third pixel that have a first signal value, a second signal value, and a third signal value, that have different spectral distributions, said first pixel and said second pixel being alternately arrayed in a predetermined direction to form a-first line, said first pixel and said third pixel being alternately arrayed in said predetermined direction to form a second line, and said first line and said second line being alternately arrayed in a direction approximately orthogonal to said predetermined direction, said image processor comprising:

interpolation means for obtaining estimated image data by estimating at least one signal value among said first signal value, said second signal value, and said third signal value at pixel positions on said image, by the image processor as set forth in claim 75;

high-frequency brightness signal generation means for generating a high-frequency brightness signal which represents brightness information of a high frequency of said image data;

brightness color-difference conversion means for converting said estimated image data to an estimated brightness signal and an estimated color difference signal which represent brightness information and color difference information of said estimated image data; and addition means for obtaining an added brightness signal by adding said estimated brightness signal and said high-frequency brightness signal;

wherein said added brightness signal and said estimated color difference signal are employed as a brightness color-difference signal of said image data.

81. The image processor as set forth in claim 80, wherein said high-frequency brightness signal generation means generates said high-frequency brightness signal by performing a filtering process on said image data through a high-pass filter for cutting a frequency component of a frequency band of said estimated brightness signal.

82. The image processor as set forth in claim 80, wherein said high-frequency brightness signal generation means generates said high-frequency brightness signal by performing a filtering process on said image data through a band-pass filter having a predetermined passband characteristic.

83. An imaging device comprising the image processor as set forth in claim 75.

84. An output device comprising the image processor as set forth in claim 75.

85. An image processor for processing image data,
said data representing an image that includes a first pixel, a second pixel, and a third pixel that have a first signal value, a second signal value, and a third signal value that have different spectral distributions,
said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
said image processor comprising estimation means for estimating at least one signal value among said first signal value, said second signal value, and said third signal value at all pixel positions, based on said first signal value, said second signal value, and said third signal value,
wherein said estimation means estimates said second signal value on said second line, based on a difference between said first signal value and said second signal value on said first line adjacent to said second line, and
wherein said estimation means estimates said third signal value on said first line, based on a difference between said first signal value and said third signal value on said second line adjacent to said first line.

86. The image processor as set forth in claim 85, wherein said estimation means estimates a third signal value at said first pixel on said first line, based on a difference between a third signal value at said third pixel adjacent to said first pixel on said second line, and said first signal value at said third pixel computed by performing a one-dimensional interpolation computation on said first signal value on said second line.

87. The image processor as set forth in claim 86, wherein said estimation means estimates a third signal value at said second pixel on said first line, based on a difference between a first signal value at said first pixel adjacent to said second pixel on said second line, and said third signal value at said first pixel computed by performing a one-dimensional interpolation computation on said third signal value on said second line.

88. The image processor as set forth in claim 86, wherein
when, in a direction orthogonal to said predetermined direction, said first and second pixels are alternately arrayed and said first and third pixels are alternately arrayed so that said first line and said second line are formed in said orthogonal direction,
said estimation means estimates at least one signal value among said first signal value, said second signal value, and said third signal value, by switching said first and second lines in said predetermined direction and said first and second lines in said orthogonal direction in accordance with a pixel position for estimating a signal value.

89. The image processor as set forth in claim 86, wherein
when, in a direction orthogonal to said predetermined direction, said first and second pixels are alternately arrayed and said first and third pixels are alternately arrayed so that said first line and said second line are formed in said orthogonal direction,
said estimation means comprises
means for computing a predetermined-direction estimated value based on said first and second lines in said predetermined direction and an orthogonal-direction estimated value based on said first and second lines in said orthogonal direction, and
means for estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

90. The image processor as set forth in claim 86, wherein an array of pixels on said first line relatively shifts out of position by approximately one-half a pixel in said predetermined direction with respect to an array of pixels on said second line so that said first, second, and third pixels are arrayed checkerwise.

91. The image processor as set forth in claim 86, wherein said image data is obtained by an imaging device having an imaging surface,
said imaging surface being formed by arraying a first photoelectric conversion element, a second photoelectric conversion element, and a third photoelectric conversion element having different spectral sensitivities, on a single surface,
said first and second photoelectric conversion elements being alternately arrayed in a predetermined direction to form a first line,
said first and third photoelectric conversion elements being alternately arrayed in said predetermined direction to form a second line, and
said first line and said second line being alternately arrayed in a direction approximately orthogonal to said predetermined direction.

92. The image processor as set forth in claim 85, wherein said estimation means estimates a third signal value at said second pixel on said first line, based on a difference between a first signal value at said first pixel adjacent to said second pixel on said second line, and said third signal value at said first pixel computed by performing a one-dimensional interpolation computation on said third signal value on said second line.

93. The image processor as set forth in claim 92, wherein
when, in a direction orthogonal to said predetermined direction, said first and second pixels are alternately arrayed and said first and third pixels are alternately arrayed so that said first line and said second line are formed in said orthogonal direction,
said estimation means estimates at least one signal value among said first signal value, said second signal value, and said third signal value, by switching said first and second lines in said predetermined direction and said first and second lines in said orthogonal direction in accordance with a pixel position for estimating a signal value.

94. The image processor as set forth in claim 92, wherein
when, in a direction orthogonal to said predetermined direction, said first and second pixels are alternately arrayed and said first and third pixels are alternately arrayed so that said first line and said second line are formed in said orthogonal direction, said estimation means comprises
means for computing a predetermined-direction estimated value based on said first and second lines in said predetermined direction and an orthogonal-direction estimated value based on said first and second lines in said orthogonal direction, and
means for estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

95. The image processor as set forth in claim 92, wherein an array of pixels on said first line relatively shifts out of position by approximately one-half a pixel in said predetermined direction with respect to an array of pixels on said second line so that said first, second, and third pixels are arrayed checkerwise.

96. The image processor as set forth in claim 92, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface,
said first and second photoelectric conversion elements being alternately arrayed in a predetermined direction to form a first line,
said first and third photoelectric conversion elements being alternately arrayed in said predetermined direction to form a second line, and
said first line and said second line being alternately arrayed in a direction approximately orthogonal to said predetermined direction.

97. The image processor as set forth in claim 85, wherein
when, in a direction orthogonal to said predetermined direction, said first and second pixels are alternately arrayed and said first and third pixels are alternately arrayed so that said first line and said second line are formed in said orthogonal direction, said estimation means estimates at least one signal value among said first signal value, said second signal value, and said third signal value, by switching said first and second lines in said predetermined direction and said first and second lines in said orthogonal direction in accordance with a pixel position for estimating a signal value.

98. The image processor as set forth in claim 85, wherein
when, in a direction orthogonal to said predetermined direction, said first and second pixels are alternately arrayed and said first and third pixels are alternately arrayed so that said first line and said second line are formed in said orthogonal direction, said estimation means comprises
means for computing a predetermined-direction estimated value-.based on said first and second lines in said predetermined direction and an orthogonal-direction estimated value based on said first and second lines in said orthogonal direction, and
means for estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

99. The image processor as set forth in claim 98, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface,
said first and second photoelectric conversion elements being alternately arrayed in a predetermined direction to form a first line,
said first and third photoelectric conversion elements being alternately arrayed in said predetermined direction to form a second line, and
said first line and said second line being alternately arrayed in a direction approximately orthogonal to said predetermined direction.

100. The image processor as set forth in claim 85, wherein an array of pixels on said first line relatively shifts out of position by approximately one-half a pixel in said predetermined direction with respect to an array of pixels on said second line so that said first, second, and third pixels are arrayed checkerwise.

101. The image processor as set forth in claim 85, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface,
said first and second photoelectric conversion elements being, alternately arrayed in a predetermined direction to form a first line,
said first and third photo electric conversion elements being alternately arrayed in said predetermined direction to form a second line, and
said first line and said second line being alternately arrayed in a direction approximately orthogonal to said predetermined direction.

102. An image processor for processing image data,
said data representing an image that includes a first pixel, a second pixel, and a third pixel that have a first signal value, a second signal value, and a third signal value, that have different spectral distributions,
said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
said image processor comprising:
interpolation means for obtaining estimated image data by estimating at least one signal value among said first signal value, said second signal value, and said third signal value at all pixel positions on said image, by the image processor as set forth in claim 85;

high-frequency brightness signal generation means for generating a high-frequency brightness signal which represents brightness information of a high frequency of said image data;

brightness color-difference conversion means for converting said estimated image data to an estimated brightness signal and an estimated color difference signal which represent brightness information and color difference information of said estimated image data; and addition means for obtaining an added brightness signal by adding said estimated brightness signal and said high-frequency brightness signal;

wherein said added brightness signal and said estimated color difference signal are employed as a brightness color-difference signal of said image data.

103. The image processor as set forth in claim 102, wherein said high-frequency brightness signal generation means generates said high-frequency brightness signal by performing a filtering process on said image data through a high-pass filter for cutting a frequency component of a frequency band of said estimated brightness signal.

104. The image processor as set forth in claim 102, wherein said high-frequency brightness signal generation means generates said high-frequency brightness signal by performing a filtering process on said image data through a band-pass filter having a predetermined passband characteristic.

105. An imaging device comprising the image processor as set forth in claim 85.

106. An output device comprising the image processor as set forth in claim 85.

107. An image processor for processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising estimation means for estimating at least one signal value among said first signal value, said second signal value, and said third signal value at all pixel positions, based on said first signal value, said second signal value, and said third signal value, wherein said estimation means estimates said second signal value on said second line, based on a difference between said first signal value and said second signal value on said first line adjacent to said second line, wherein said estimation means estimates a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein said estimation means estimates said third signal value on said first line, based on a difference between said first signal value and said third signal value on said second line adjacent to said first line.

108. The image processor as set forth in claim 107, wherein when, in a direction orthogonal to said predetermined direction, said first and second pixels are alternately arrayed and said first and third pixels are alternately arrayed so that said first line and said second line are formed in said orthogonal direction, said estimation means comprises means for computing a predetermined-direction estimated value based on said first and second lines in said predetermined direction and an orthogonal-direction estimated value based on said first and second lines in said orthogonal direction, and means for estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

109. The image processor as set forth in claim 108, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

110. The image processor as set forth in claim 107, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

111. An image processor for processing image data, said data representing an image that includes a first pixel, a second pixel, and a third pixel that have a first signal value, a second signal value, and a third signal value, that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising:
- interpolation means for obtaining estimated image data by estimating at least one signal value among said first signal value, said second signal value, and said third signal value at all pixel positions on said image, by the image Preprocessor as set forth in claim 107;
- high-frequency brightness signal generation means for generating a high-frequency brightness signal which represents brightness information of a high frequency of said image data;
- brightness color-difference conversion means for converting said estimated image data to an estimated brightness signal and an estimated color difference signal which represent brightness information and color difference information of said estimated image data; and
- addition means for obtaining an added brightness signal by adding said estimated brightness signal and said high-frequency brightness signal;
- wherein said added brightness signal and said estimated color difference signal are employed as a brightness color-difference signal of said image data.

112. The image processor as set forth in claim 111, wherein said high-frequency brightness signal generation means generates said high-frequency brightness signal by performing a filtering process on said image data through a high-pass filter for cutting a frequency component of a frequency band of said estimated brightness signal.

113. The image processor as set forth in claim 111, wherein said high-frequency brightness signal generation means generates said high-frequency brightness signal by performing a filtering process on said image data through a band-pass filter having a predetermined passband characteristic.

114. An imaging device comprising the image processor as set forth in claim 107.

115. An output device comprising the image processor as set forth in claim 107.

116. An image processor for processing image data,
- said data representing an image that includes a first pixel, a second pixel, and a third pixel that have a first signal value, a second signal value, and a third signal value that have different spectral distributions,
- said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
- said image processor comprising estimation means for estimating at least one signal value among said first signal value, said second signal value, and said third signal value at all pixel positions, based on said first signal value, said second signal value, and said third signal value,
- wherein said estimation means estimates said second signal value on said second line, based on a difference between said first signal value and said second signal value on said first line adjacent to said second line, and wherein
- when, in a direction orthogonal to said predetermined direction, said first and second pixels are alternately arrayed and said first and third pixels are alternately arrayed so that said first line and said second line are formed in said orthogonal direction,
- said estimation means estimates at least one signal value among said first signal value, said second signal value, and said third signal value, by switching said first and second lines in said predetermined direction and said first and second lines in said orthogonal direction in accordance with a pixel position for estimating a signal value.

117. The image processor as set forth in claim 116, wherein an array of pixels on said first line relatively shifts out of position by approximately one-half a pixel in said predetermined direction with respect to an array of pixels on said second line so that said first, second, and third pixels are arrayed checkerwise.

118. The image processor as set forth in claim 116, wherein said image data is obtained by an imaging device having an imaging surface,
- said imaging surface being formed by arraying a first photoelectric conversion element, a second photoelectric conversion element, and a third photoelectric conversion element having different spectral sensitivities, on a single surface,
- said first and second photoelectric conversion elements being alternately arrayed in a predetermined direction to form a first line,
- said first and third photoelectric conversion elements being alternately arrayed in said predetermined direction to form a second line, and
- said first line and said second line being alternately arrayed in a direction approximately orthogonal to said predetermined direction.

119. An image processor for processing image data,
- said data representing an image that includes a first pixel, a second pixel, and a third pixel that have a first signal value, a second signal value, and a third signal value that have different spectral distributions,
- said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction,
- said image processor comprising estimation means for estimating at least one signal value among said first signal value, said second signal value, and said third signal value at all pixel positions, based on said first signal value, said second signal value, and said third signal value,
- wherein said estimation means estimates said second signal value on said second line, based on a difference between said first signal value and said second signal value on said first line adjacent to said second line,
- wherein said estimation means estimates a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein
- when, in a direction orthogonal to said predetermined direction, said first and second pixels are alternately arrayed and said first and third pixels are alternately arrayed so that said first line and said second line are formed in said orthogonal direction,
- said estimation means estimates at least one signal value among said first signal value, said second signal value, and said third signal value, by switching said first and second lines in said predetermined direction and said first and second lines in said orthogonal direction in accordance with a pixel position for estimating a signal value.

120. An image processor for processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising estimation means for estimating at least one signal value among said first signal value, said second signal value, and said third signal value at all pixel positions, based on said first signal value, said second signal value, and said third signal value, wherein said estimation means estimates said second signal value on said second line, based on a difference between said first signal value and said second signal value on said first line adjacent to said second line, and wherein an array of pixels on said first line relatively shifts out of position by approximately one-half a pixel in said predetermined direction with respect to an array of pixels on said second line so that said first, second, and third pixels are arrayed checkerwise.

121. The image processor as set forth in claim 120, wherein said estimation means estimates signal values at all pixel positions and also estimates signal values at vacant pixel positions, based on said estimated signal values.

122. The image processor as set forth in claim 121, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

123. The image processor as set forth in claim 120, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

124. An image processor for processing image data, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processor comprising estimation means for estimating at least one signal value among said first signal value, said second signal value, and said third signal value at all pixel positions, based on said first signal value, said second signal value, and said third signal value, wherein said estimation means estimates said second signal value on said second line, based on a difference between said first signal value and said second signal value on said first line adjacent to said second line, wherein said estimation means estimates a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein an array of pixels on said first line relatively shifts out of position by approximately one-half a pixel in said predetermined direction with respect to an array of pixels on said second line so that said first, second, and third pixels are arrayed checkerwise.

125. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, and wherein said estimating procedure is a procedure of estimating a second signal value at said third pixel on said second line, based on a difference between a first signal value at said first pixel adjacent to said third pixel on said first line, and said second signal value at said first pixel computed by performing a one-dimensional interpolation computation on said second signal value on said first line.

126. The storage medium as set forth in claim 125, wherein said estimating procedure is a procedure of estimating said third signal value on said first line, based on a difference between said first signal value and said third signal value on said second line adjacent to said first line.

127. The storage medium as set forth in claim 125, wherein when, in a direction orthogonal to said predetermined direction, said first and second pixels are alternately arrayed and said first and third pixels are alternately arrayed so that said first line and said second line are formed in said orthogonal direction, said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

128. The storage medium as set forth in claim 125, wherein when, in a direction orthogonal to said predetermined direction, said first and second pixels are alternately arrayed and said first and third pixels are alternately arrayed so that said first line and said second line are formed in said orthogonal direction, said estimating procedure has a procedure of computing a predetermined-direction estimated value based on said first and second lines in said predetermined direction and an orthogonal-direction estimated value based on said first and second lines in said orthogonal direction, and a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

129. The storage medium as set forth in claim 128, wherein an array of pixels on said first line relatively shifts out of position by approximately one-half a pixel in said predetermined direction with respect to an array of pixels on said second line so that said first, second, and third pixels are arrayed checkerwise.

130. The storage medium as set forth in claim 128, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

131. The storage medium as set forth in claim 125, wherein an array of pixels on said first line relatively shifts out of position by approximately one-half a pixel in said predetermined direction with respect to an array of pixels on said second line so that said first, second, and third pixels are arrayed checkerwise.

132. The storage medium as set forth in claim 125, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

133. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, wherein said estimating procedure is a procedure of estimating a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein said estimating procedure is a procedure of estimating a second signal value at said third pixel on said second line, based on a difference between a first signal value at said first pixel adjacent to said third pixel on said first line, and said second signal value at said first pixel computed by performing a one-dimensional interpolation computation on said second signal value on said first line.

134. The storage medium as set forth in claim 133, wherein
   when, in a direction orthogonal to said predetermined direction, said first and second pixels are alternately arrayed and said first and third pixels are alternately arrayed so that said first line and said second line are formed in said orthogonal direction,
   said estimating procedure has
   a procedure of computing a predetermined-direction estimated value based on said first and second lines in said predetermined direction and an orthogonal-direction estimated value based on said first and second lines in said orthogonal direction, and
   a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

135. The storage medium as set forth in claim 134, wherein an array of pixels on said first line relatively shifts out of position by approximately one-half a pixel in said predetermined direction with respect to an array of pixels on said second line so that said first, second, and third pixels are arrayed checkerwise.

136. The storage medium as set forth in claim 134, wherein said image data is obtained by an imaging device having an imaging surface,
   said imaging surface being formed by arraying a first photoelectric conversion element, a second photoelectric conversion element, and a third photoelectric conversion element having different spectral sensitivities, on a single surface,
   said first and second photoelectric conversion elements being alternately arrayed in a predetermined direction to form a first line,
   said first and third photoelectric conversion elements being alternately arrayed in said predetermined direction to form a second line, and
   said first line and said second line being alternately arrayed in a direction approximately orthogonal to said predetermined direction.

137. The storage medium as set forth in claim 133, wherein said image data is obtained by an imaging device having an imaging surface,
   said imaging surface being formed by arraying a first photoelectric conversion element, a second photoelectric conversion element, and a third photoelectric conversion element having different spectral sensitivities, on a single surface,
   said first and second photoelectric conversion elements being alternately arrayed in a predetermined direction to form a first line,
   said first and third photoelectric conversion elements being alternately arrayed in said predetermined direction to form a second line, and
   said first line and said second line being alternately arrayed a direction approximately orthogonal to said predetermined direction.

138. A computer readable storage medium in which a program for causing a computer to execute a method of processing image data is stored,
   said data representing an image that includes a first pixel, a second pixel, and a third pixel that have a first signal value, a second signal value, and a third signal value that have different spectral distributions,
   said first pixel and said second pixel being alternately arrayed in a predetermined direction to form a first line, said first pixel and said third pixel being alternately arrayed in said predetermined direction to form-a second line, and said first line and said second line being alternately arrayed in a direction approximately orthogonal to said predetermined direction,
   said image processing method being used for estimating at least one signal value among said first signal value, said second signal value, and said third signal value at all pixel positions, based on said first signal value, said second signal value, and said third signal value,
   said program having a procedure of estimating said second signal value on said second line, based on a difference between said first signal value and said second signal value on said first line adjacent to said second line, and
   wherein said estimating procedure is a procedure of estimating said third signal value on said first line, based on a difference between said first signal value and said third signal value on said second line adjacent to said first line.

139. The storage medium as set forth in claim 138, wherein said estimating procedure is a procedure of estimating a third signal value at said first pixel on said first line, based on a difference between a third signal value at said third pixel adjacent to said first pixel on said second line, and said first signal value at said third pixel computed by performing a one-dimensional interpolation computation on said first signal value on said second line.

140. The storage medium as set forth in claim 139, wherein said estimating procedure is a procedure of estimating a third signal value at said second pixel on said first line, based on a difference between a first signal value at said first pixel adjacent to said second pixel on said second line, and said third signal value at said first pixel computed by performing a one-dimensional interpolation computation on said third signal value on said second line.

141. The storage medium as set forth in claim 139, wherein
   when, in a direction orthogonal to said predetermined direction, said first and second pixels are alternately arrayed and said first and third pixels are alternately arrayed so that said first line and said second line are formed in said orthogonal direction,
   said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

142. The storage medium as set forth in claim 139, wherein
   when, in a direction orthogonal to said predetermined direction, said first and second pixels are alternately arrayed and said first and third pixels are alternately arrayed so that said first line and said second line are formed in said orthogonal direction,
   said estimating procedure has
   a procedure of computing a predetermined-direction estimated value based on said first and second lines in said predetermined direction and an orthogonal-direction estimated value based on said first and second lines in said orthogonal direction, and a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

143. The storage medium as set forth in claim 139, wherein an array of pixels on said first line relatively shifts out of position by approximately one-half a pixel in said predetermined direction with respect to an array of pixels on said second line so that said first, second, and third pixels are arrayed checkerwise.

144. The storage medium as set forth in claim 139, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second- line, and said first line and said second line being alternately arrayed in a direction approximately orthogonal to said predetermined direction.

145. The storage medium as set forth in claim 138, wherein said estimating procedure is a procedure of estimating a third signal value at said second pixel on said first line, based on a difference between a first signal value at said first pixel adjacent to said second pixel on said second line, and said third signal value at said first pixel computed by performing a one-dimensional interpolation computation on said third signal value on said second line.

146. The storage medium as set forth in claim 145, wherein when, in a direction orthogonal to said predetermined direction, said first and second pixels are alternately arrayed and said first and third pixels are alternately arrayed so that said first line and said second line are formed in said orthogonal direction, said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

147. The storage medium as set forth in claim 145, wherein when, in a direction orthogonal to said predetermined direction, said first and second pixels are alternately arrayed and said first and third pixels are alternately arrayed so that said first line and said second line are formed in said orthogonal direction, said estimating procedure has a procedure of computing a predetermined-direction estimated value based on said first and second lines in said predetermined direction and an orthogonal-direction estimated value based on said first and second lines in said orthogonal direction, and a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

148. The storage medium as set forth in claim 145, wherein an array of pixels on said first line relatively shifts out of position by approximately one-half a pixel in said predetermined direction with respect to an array of pixels on said second line so that said first, second, and third pixels are arrayed checkerwise.

149. The storage medium as set forth in claim 145, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

150. The storage medium as set forth in claim 138, wherein when, in a direction orthogonal to said predetermined direction, said first and second pixels are alternately arrayed and said first and third pixels are alternately arrayed so that said first line and said second line are formed in said orthogonal direction, said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

151. The storage medium as set forth in claim 138, wherein when, a direction orthogonal to said predetermined direction, said first and second pixels are alternately arrayed and said first and third pixels are alternately arrayed so that said first line and said second line are formed in said orthogonal direction, said estimating procedure has a procedure of computing a predetermined-direction estimated value based on said first and second lines in said predetermined direction and an orthogonal-direction estimated value based on said first and second lines in said orthogonal direction, and a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

152. The storage medium as set forth in claim 151, wherein an array of pixels on said first line relatively shifts out of position by approximately one-half a pixel in said predetermined direction with respect to an array of pixels on said second line so that said first, second, and third pixels are arrayed checkerwise.

153. The storage medium as set forth in claim 151, wherein said image data is obtained by an imaging device having an imaging surface,
- said imaging surface being formed by arraying a first photoelectric conversion element, a second photoelectric conversion element, and a third photoelectric conversion element having different spectral sensitivities, on a single surface,
- said first and second photoelectric conversion elements being alternately arrayed in a predetermined direction to form a first line,
- said first and third photoelectric conversion elements being alternately arrayed in said predetermined direction to form a second line, and
- said first line and said second line being alternately arrayed in a direction approximately orthogonal to said predetermined direction.

154. The storage medium as set forth in claim 138, wherein an array of pixels on said first line relatively shifts out of position by approximately one-half a pixel in said predetermined direction with respect to an array of pixels on said second line so that said first, second, and third pixels are arrayed checkerwise.

155. The storage medium as set forth in claim 138, wherein said image data is obtained by an imaging device having an imaging surface,
- said imaging surface being formed by arraying a first photoelectric conversion element, a second photoelectric conversion element, and a third photoelectric conversion element having different spectral sensitivities, on a single surface,
- said first and second photoelectric conversion elements being alternately arrayed in a predetermined direction to form a first line,
- said first and third photoelectric conversion elements being alternately arrayed in said predetermined direction to form a second line, and
- said first line and said second line being alternately arrayed in a direction approximately orthogonal to said predetermined direction.

156. A computer readable storage medium in which a program for causing a computer to execute a method of processing image data is stored,
- said data representing an image that includes a first pixel, a second pixel, and a third pixel that have a first signal value, a second signal value, and a third signal value that have different spectral distributions,
- said first pixel and said second pixel being alternately arrayed in a predetermined direction to form a first line, said first pixel and said third pixel being alternately arrayed in said predetermined direction to form a second line, and said first line and said second line being alternately arrived in a direction approximately orthogonal to said predetermined direction,
- said image processing method being used for estimating at least one signal value among said first signal value, said second signal value, and said third signal value at all pixel positions, based on said first signal value, said second signal value, and said third signal value,
- said program having a procedure of estimating said second signal value on said second line, based on a difference between said first signal value and said second signal value on said first line adjacent to said second line,
- wherein said estimating procedure is a procedure of estimating a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and
- wherein said estimating procedure is a procedure of estimating said third signal value on said first line, based on a difference between said first signal value and said third signal value on said second line adjacent to said first line.

157. The storage medium as set forth in claim 156, wherein
- when, in a direction orthogonal to said predetermined direction, said first and second pixels are alternately arrayed and said first and third pixels are alternately arrayed so that said first line and said second line are formed in said orthogonal direction,
- said estimating procedure has
- a procedure of computing a predetermined-direction estimated value based on said first and second lines in said predetermined direction and an orthogonal-direction estimated value based on said first and second lines in said orthogonal direction, and
- a procedure of estimating at least one signal value among said first signal value, said second signal value, and said third signal value, by weighting and adding said predetermined-direction estimated value and said orthogonal-direction estimated value by a predetermined weighting coefficient in accordance with a pixel position for estimating a signal value.

158. The storage medium as set forth in claim 157, wherein an array of pixels on said first line relatively shifts out of position by approximately one-half a pixel in said predetermined direction with respect to an array of pixels on said second line so that said first, second, and third pixels are arrayed checkerwise.

159. The storage medium as set forth in claim 157, wherein said image data is obtained by an imaging device having an imaging surface,
- said imaging surface being formed by arraying a first photoelectric conversion element, a second photoelectric conversion element, and a third photoelectric conversion element having different spectral sensitivities, on a single surface,
- said first and second photoelectric conversion elements being alternately arrayed in a predetermined direction to form a first line,
- said first and third photoelectric conversion elements being alternately arrayed in said predetermined direction to form a second line, and
- said first line and said second line being alternately arrayed in a direction approximately orthogonal to said predetermined direction.

160. The storage medium as set forth in claim 156, wherein said image data is obtained by an imaging device having an imaging surface,
- said imaging surface being formed by arraying a first photoelectric conversion element, a second photoelectric conversion element, and a third photoelectric conversion element having different spectral sensitivities, on a single surface,
- said first and second photoelectric conversion elements being alternately arrayed in a predetermined direction to form a first line, said first and third photoelectric conversion elements being alternately arrayed in said predetermined direction to form a second line, and said first line and said second line being alternately arrayed a direction approximately orthogonal to said predetermined direction.

161. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, and wherein when, in a direction orthogonal to said predetermined direction, said first and second pixels are alternately arrayed and said first and third pixels are alternately arrayed so that said first line and said second line are formed in said orthogonal direction, said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

162. The storage medium as set forth in claim 161, wherein an array of pixels on said first line relatively shifts out of position by approximately one-half a pixel in said predetermined direction with respect to an array of pixels on said second line so that said first, second, and third pixels are arrayed checkerwise.

163. The storage medium as set forth in claim 161, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

164. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, wherein said estimating procedure is a procedure of estimating a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein when, in a direction orthogonal to said predetermined direction, said first and second pixels are alternately arrayed and said first and third pixels are alternately arrayed so that said first line and said second line are formed in said orthogonal direction, said estimating procedure is a procedure of estimating at least one signal value among said first signal value, said second signal value, and said third signal value, by switching said first and second lines in said predetermined direction and said first and second lines in said orthogonal direction in accordance with a pixel position for estimating a signal value.

165. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, and wherein an array of pixels on said first line relatively shifts out of position by approximately one-half a pixel in said predetermined direction with respect to an array of pixels on said second line so that said first, second, and third pixels are arrayed checkerwise.

166. The storage medium as set forth in claim 165, wherein said estimating means has a procedure of estimating signal values at all pixel positions and also estimating signal values at vacancy pixel positions, based on said estimated signal values.

167. The storage medium as set forth in claim 166, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

168. The storage medium as set forth in claim 165, wherein said image data is obtained by an imaging device having an imaging surface, said imaging surface being formed by arraying a first photoelectric conversion element, a second photoelectric conversion element, and a third photoelectric conversion element having different spectral sensitivities, on a single surface, said first and second photoelectric conversion elements being alternately arrayed in a predetermined direction to form a first line, said first and third photoelectric conversion elements being alternately arrayed in said predetermined direction to form a second line, and said first line and said second line being alternately arrayed in a direction approximately orthogonal to said predetermined direction.

169. A computer readable storage medium in which a program for causing a computer to execute a method of processing image data is stored, said data representing an image that includes a first pixel, a second pixel, and a third pixel that have a first signal value, a second signal value, and a third signal value that have different spectral distributions, said first pixel and said second pixel being alternately arrayed in a predetermined direction to form a first line, said first pixel and said third pixel being alternately arrayed in said predetermined direction to form a second line, and said first line and said second line being alternately arrayed in a direction approximately orthogonal to said predetermined direction, said image processing method being used for estimating at least one signal value among said first signal value, said second signal value, and said third signal value at all pixel positions, based on said first signal value, said second signal value, and said third signal value, said program having a procedure of estimating said second signal value on said second line, based on a difference between said first signal value and said second signal value on said first line adjacent to said second line, wherein said estimating procedure is a procedure of estimating a second signal value at said first pixel on said second line, based on a difference between a second signal value at said second pixel adjacent to said first pixel on said first line, and said first signal value at said second pixel computed by performing a one-dimensional interpolation computation on said first signal value on said first line, and wherein an array of pixels on said first line relatively shifts out of position by approximately one-half a pixel in said predetermined direction with respect to an array of pixels on said second line so that said first, second, and third pixels are arrayed checkerwise.

* * * * *